United States Patent
Lozhkin

(10) Patent No.: US 7,274,744 B2
(45) Date of Patent: Sep. 25, 2007

(54) MULTICARRIER COMMUNICATION SYSTEM AND RECEPTION DEVICE FOR SAME

(75) Inventor: Alexander N. Lozhkin, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 11/049,345

(22) Filed: Feb. 2, 2005

(65) Prior Publication Data

US 2005/0152468 A1 Jul. 14, 2005

Related U.S. Application Data

(63) Continuation of application No. PCT/JP02/08764, filed on Aug. 30, 2002.

(51) Int. Cl.
*H04L 27/28* (2006.01)

(52) U.S. Cl. ............ 375/260; 375/147; 375/262; 375/285; 375/346; 714/794; 370/203; 370/344; 370/442; 370/478

(58) Field of Classification Search ............ 375/141, 375/147, 260, 262, 265, 285, 324, 340, 341, 375/346; 714/792, 794, 795, 786; 370/203, 370/281, 321, 344, 436, 442, 464, 465, 478
See application file for complete search history.

(56) References Cited

U.S. PATENT DOCUMENTS 6,895,060 B2 * 5/2005 Kroeger et al. ............ 375/340

7,095,791 B2 * 8/2006 Jones et al. ................ 375/260
2004/0156456 A1 * 8/2004 Wu et al.

FOREIGN PATENT DOCUMENTS

| JP | 1-125135 | 5/1989 |
|---|---|---|
| JP | 7-283806 | 10/1995 |
| JP | 2001-168738 | 6/2001 |

OTHER PUBLICATIONS

Supplementary European Search Report dated Nov. 25, 2005.
E. Viterbo et al. How to combat long echoes in OFDM transmission schemes; Sub-channel equalization or more powerful channel coding. Global Telecommunications Conference, vol. 3, Nov. 13, 1995, pp. 2069-2074, XP002352598.
International Search Report dated Dec. 17, 2002.

* cited by examiner

*Primary Examiner*—Dac V. Ha
(74) *Attorney, Agent, or Firm*—Katten Muchin Rosenman LLP

(57) ABSTRACT

A reception device receives and demodulates, for each subchannel, data transmitted independently via three subchannels, which are a subchannel of interest and the two upper and lower adjacent subchannels which interfere with the subchannel of interest. A reception portion provided for each subchannel computes, as a soft decision value, the probability that data received from the subchannel of interest is "0" and the probability that the data is "1", taking into account the degree of coupling between channels, and moreover uses the soft decision values input from the two upper and lower adjacent reception devices to adjust and output the soft decision value for the subchannel of interest, and based on the adjusted soft decision value, decides whether the received data is "0" or "1".

7 Claims, 10 Drawing Sheets

MULTICARRIER COMMUNICATION SYSTEM AND RECEPTION DEVICE FOR SAME

CROSS-REFERENCE TO RELATED APPLICATION

This application is a continuation of an International Application No. PCT/JP02/08764 which was filed on Aug. 30, 2002, which is herein incorporated by reference.

BACKGROUND OF THE INVENTION

This invention relates to a multicarrier communication system and a reception device for such a system, and in particular relates to a multicarrier communication system and reception device for same which utilizes interchannel interference (ICI) between the upper and lower two subchannels and the channel of interest.

The bit error rate (BER) in filter bank modulation, DMT modulation, FMT modulation, and other multicarrier communication systems can be improved through the use of received signals comprised by interchannel interference (ICI). Interchannel interference arises from erroneous operation system operation in communication systems, or due to unavoidable environment conditions such as loss of orthogonality between subcarriers. This interchannel interference is caused by spectral energy leakage, and in some cases by a kind of leakage between subchannels called crosstalk.

A turbo-receiver of this invention is based on a maximum posterior probability algorithm utilizing ICI. In this turbo-receiver, information derived from one subchannel after nonlinear processing is refined by the maximum posterior probability of the other subchannel, and similarly, information derived from the other subchannel is refined by the maximum posterior probability of the first subchannel.

[See for example] K. Sathananthan and C. Tellambura, "Probability of error calculation of OFDM system with frequency offset", IEEE Trans. Commun., Vol. 49, No. 11, November 2001, pp. 1884-1888.

(a) Relation of Frequency Offset to ICI

In a multicarrier communication system in which a frequency band is divided into a plurality of independent narrow subbands, and moreover the transmission data for each subband is frequency-multiplexed, transmitted and received, and in particular in a multicarrier communication system employing filter bank modulation, DMT (discrete multitone) modulation, FMT (filtered multitone) modulation and similar, selection of the filter set has been executed under the constraint of completely eliminating intersymbol interference (ISI) and interchannel interference (ICI).

In an ideal transmission channel in which there is no Doppler shift, there is no offset frequency between transmitter and receiver, and moreover signal distortion does not occur, this constraint guarantees the error-free restoration of transmitted symbols in the receiver. However, a frequency offset in a channel, arising from inaccurate oscillator tuning and Doppler shifts, will in turn cause BER degradation due to spectral leakage or ICI.

The only method for alleviating such BER degradation is to reduce the frequency offset to the extent possible, and specifically, to hold the frequency offset to within 1% of the subcarrier frequency interval. However, this method requires accurate estimation of the frequency offset, and in addition when multicarrier signals are received with noise intermixed, if the noise level is high there is the problem that the accuracy of frequency offset estimation is impaired.

Further, in a high-speed fading channel, that is, in a channel in which the Doppler shift is not constant for transmission symbols, and in a high-speed fading channel which changes with time, this method does not operate correctly.

Here, a DMT-base system and an ideal white Gaussian noise channel are supposed. The level of intersymbol interference (ISI) is assumed to be negligible in comparison with interchannel interference (ICI) and other noise signals. To simplify, only the subchannel of interest, a first adjacent subchannel positioned below the subchannel of interest, and a second adjacent subchannel positioned above the subchannel of interest are considered. FIG. 1 and FIG. 2 show the frequency response of the three subchannels cases in which the frequency offset is zero (FIG. 1) and in which the frequency offset is not zero (FIG. 2). The signals of the central frequencies $f_1$, $f_2$, $f_3$ corresponding to the first, second and third subchannels are indicated by vertical arrows in FIG. 1 and FIG. 2. In FIG. 1 and FIG. 2, the subchannel number 0 (ch0) indicates the subchannel of interest, the subchannel number −1 (ch−1) indicates the subchannel positioned below the subchannel of interest on the frequency scale, and the subchannel number +1 (ch+1) indicates the subchannel positioned above the subchannel of interest on the frequency scale. If the DMT symbol period is T, then the frequency scale is normalized by the channel interval, equal to 1/T. That is, one unit of the frequency scale is the channel interval. As shown in FIG. 1, when the frequency offset (normalized by the channel interval) $\alpha$ is 0, the transfer functions of the lower subchannel and upper subchannel, represented by the solid line A and the broken line B in the figure, result in infinite attenuation at the central frequency $f_2$ of the subchannel of interest (dotted line C). Similarly, the transfer function of the subchannel of interest results in infinite attenuation at the central frequencies $f_1$ and $f_3$ of the lower and upper subchannels. That is, if the frequency offset $\alpha$ is zero, then ICI does not occur between adjacent channels. In other words, if the frequency offset is zero, subchannels are orthogonal, and ICI is completely nonexistent.

However, if the frequency offset $\alpha$ is not zero, the subchannel orthogonality collapses and ICI occurs. FIG. 2 shows the spectral characteristics of each subchannel when the frequency offset $\alpha$ is not zero in a DMT system. The spectra of adjacent subchannels clearly have nonzero mutual gains, indicated in FIG. 2 by $\alpha_{0-1}$, $\alpha_{10}$, $\alpha_{-10}$, $\alpha_{01}$. In this notation, the first index of $\alpha$ indicates the subchannel which is the source of interference, and the second index indicates the subchannel in which interference occurs. That is, $\alpha_{0-1}$ indicates the leakage transfer coefficient (amplitude) from the subchannel of interest with number 0 to the lower subchannel with subchannel number −1, $\alpha_{10}$ indicates the leakage transfer coefficient from the upper subchannel with number +1 to the subchannel of interest with subchannel 0, $\alpha_{-10}$ indicates the leakage transfer coefficient from the lower subchannel with subchannel number −1 to the subchannel of interest with number 0, and $\alpha_{01}$ indicates the leakage transfer coefficient from the subchannel of interest with number 0 to the upper subchannel with subchannel number +1. In this way, if the frequency offset $\alpha$ is not zero, a nonzero mutual gain, that is, ICI between subchannels (crosstalk) occurs.

(b) Generalized Model of Communication Systems

FIG. 3 is a general model intended to illustrate the mutual ICI between three subchannels in a DMT system having frequency offsets. $1_1$, $1_2$, $1_3$ are transmission devices for the subchannels ch−1, ch0, ch+1; $2_1$, $2_2$, $2_3$ are reception devices for the respective subchannels; $3_1$, $3_2$, $3_3$ are transmission paths for the respective subchannels; $4_{ij}$ are multipliers to multiply the leakage transfer coefficient (interference coefficient) $\alpha_{ij}$ from subchannel number i to subchannel number j by the subchannel signal Di; $5_1$, $5_2$, $5_3$ are synthesis portions which synthesize crosstalk (ICI) from other subchannels with their own subchannel signals; and $6_1$, $6_2$, $6_3$ are noise synthesis portions.

As is clear from FIG. 3, signals from the lower subchannel ch−1 leak into the subchannel of interest ch0 via the crosstalk coefficient $\alpha_{-10}$, and signals from the upper subchannel ch+1 leak into the subchannel of interest via the crosstalk coefficient $\alpha_{10}$. The model of FIG. 3 can also be applied to a multicarrier communication system having N subchannels greater than 3, without limiting the number of subchannels in the entire communication system, if the subchannels undergoing mutual interference are limited to the upper and lower subchannels. However, in this case also interference in each of the subchannels is only from the upper and lower adjacent subchannels. In this case, the interference coefficients describe a coefficient chain. Because of frequency orthogonality between subchanhels, the noise components denoted by $n_1(t)$, $n_2(t)$, $n_3(t)$ in FIG. 3 are statistically independent (uncorrelated).

It has been assumed that subchannels are positioned in the frequency domain; however, a similar model can also be applied to other systems, in addition to systems using DMT modulation, filter bank modulation methods and similar.

(c) Technical Problems

The model of FIG. 3 is useful for understanding the physical process which is the cause of ICI. In terms of this model, the problem is to make possible correct determination of the signals received in each subchannel and the values of transmission information symbols (if binary, then codes), even when ICI occurs.

One method which holds the possibility of alleviating ICI in reception devices is adoption of the decision feedback equalizer (DFE) for ICI cancellation proposed in Viterbo and K. Fazel, "How to combat long echoes in QFDM transmission schemes: Subchannel equalization or more powerful channel coding", Proc. IEEE Globecom '95, Singapore, November 1995, pp. 2069-2074.

However, if the outputs of each reception device are in hard bit decision (hard decision) format, then even if information is shared among subchannels, there is only a very slight advantage. This limits the range of operation of DFE, which uses hard decisions.

Even if the above-described approach is useful in numerous actual cases, benefits depend on the extent to which the ICI effect is minimized. This is because ICI comprises information relating to transmission symbols, and there is the possibility that the transmission symbol information comprised by the ICI can be used in satisfactory demodulation of received signals.

SUMMARY OF THE INVENTION

In light of the above, an object of this invention is to improve the BER performance using the ICI in a communication system in which ICI exists.

Another object of this invention is to lower the BER based on posterior probabilities utilizing ICI.

This invention relates to a multicarrier communication system in which signals are transmitted and received via at least three adjacent subchannels, comprising (1) a transmission device which transmits data via at least three adjacent subchannels independently; (2) a reception device comprising reception portions, provided for each subchannel, which receives data from the corresponding subchannel, and which perform soft decisions on the received data; and, (3) means for inputting, to the reception portion of the central subchannel, soft-decision values in the reception portions corresponding to the two adjacent subchannels. The reception portion of the central subchannel uses the soft-decision values input from the two adjacent reception portions to adjust its own soft-decision values, and based on the soft decision values, executes decisions on received data.

Each of the above reception portions comprises (1) means for computing, as the above soft decision value, the difference between the probability that data received from the subchannel of interest is one binary value, and the probability that it is the other binary value, taking into account the degree of coupling between subchannels; (2) means for adjusting its own soft decision values, using the above soft decision values input from the two reception portions of the adjacent subchannels; and, (3) a decision portion which executes decisions on received data based on the soft decision values.

The above reception portion of the central subchannel comprises (1) means, when the data transmitted by the three subchannel signals is the same, for creating a first reference signal, calculated taking into account crosstalk from the other two subchannels, and when one among the three data items transmitted by the above three subchannel signals is different, of creating second, third and fourth reference signals, calculated taking into account the crosstalk from the other two subchannels among the three combinations; (2) four correlation means for integrating the respective results of multiplication of the reference signals with the actual received signals; (3) means for synthesizing the outputs of each of the correlation means and for outputting its own soft decision values, as well as for outputting three correlation synthesis signals for use in adjusting soft decision values; (4) first through third addition portions, which add to the above three correlation synthesis signals the above soft decision values input from the reception portions of the adjacent subchannels; (5) means for calculating adjustment values for adjustment of its own soft decision values, based on the addition results of each of the addition portions; (6) an adjustment portion, which adds the above adjustment values to its own soft decision values and adjusts its own soft decision values; and, (7) a decision portion, which executes decisions on received data based on the soft decision values.

Further, the above adjustment value calculation means comprises (1) a first adjustment portion which, based on the addition results of the above first addition portion, calculates a first adjustment value to adjust its own soft decision value; (2) a second adjustment portion which, based on the addition results of the above second addition portion, calculates a second adjustment value to adjust its own soft decision value; and, (3) a third adjustment portion which, based on the addition results of the above third addition portion, calculates a third adjustment value to adjust its own soft decision value; and, each adjustment portion indicates a negative amplitude limit value for negative input, indicates a positive amplitude limit value for positive input, and moreover is configured with a nonlinear unit comprising a linear relation between input and output close to and on both sides of zero input.

BRIEF DESCRIPTION OF THE DRAWINGS

DESCRIPTION OF THE PREFERRED EMBODIMENTS (A) Overall Configuration of a Communication System of this Invention FIG. 4 shows the overall configuration of a communication system of this invention, in which interference between a subchannel of interest and the upper and lower two adjacent subchannels is utilized to demodulate data received in the subchannel of interest. The communication system comprises three transmission devices 21, 22, 23, which transmit data independently over three subchannels ch−1, ch0, ch+1, respectively; numerous crosstalk paths $31_{ij}$, having coupling coefficients $\alpha_{ij}$ from the ith subchannel to the jth subchannel; three reception devices 40, 50, 60, provided for each of the subchannels, which receive data from the corresponding subchannel and perform soft decisions of the received data; and means 71, 72 for input to other reception devices of the soft decision values of each of the reception devices. 32 through 34 and 35 through 37 are synthesis portions which synthesize ICI signals and noise.

The reception device 50 of subchannel ch0 utilizes soft decision values input from the reception devices 40, 60 of the lower and upper subchannels ch−1, ch+1 to adjust its own soft decision values, and based on these soft decision values, executes "0" and "1" decisions for received data. Similarly, other reception devices also use soft decision values input from the reception devices of lower and upper subchannels to adjust their own soft decision values, and based on these soft decision values, execute "0" and "1" judgments of received data.

(B) Algorithm for Received Symbol Demodulation

Figure 1:
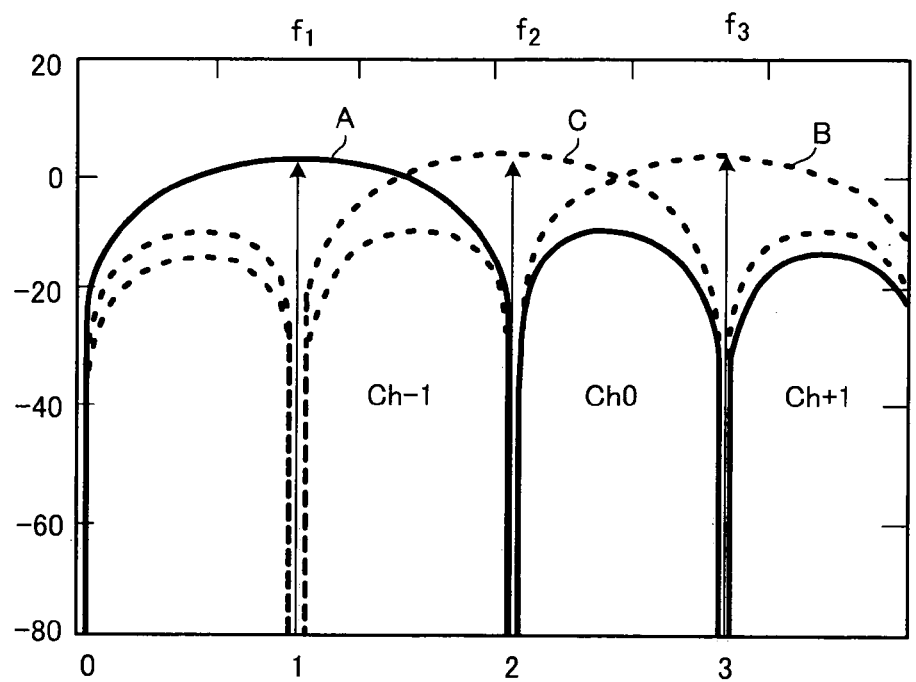
FIG. 1 shows the frequency characteristics when the frequency offset is zero.
Figure 2:
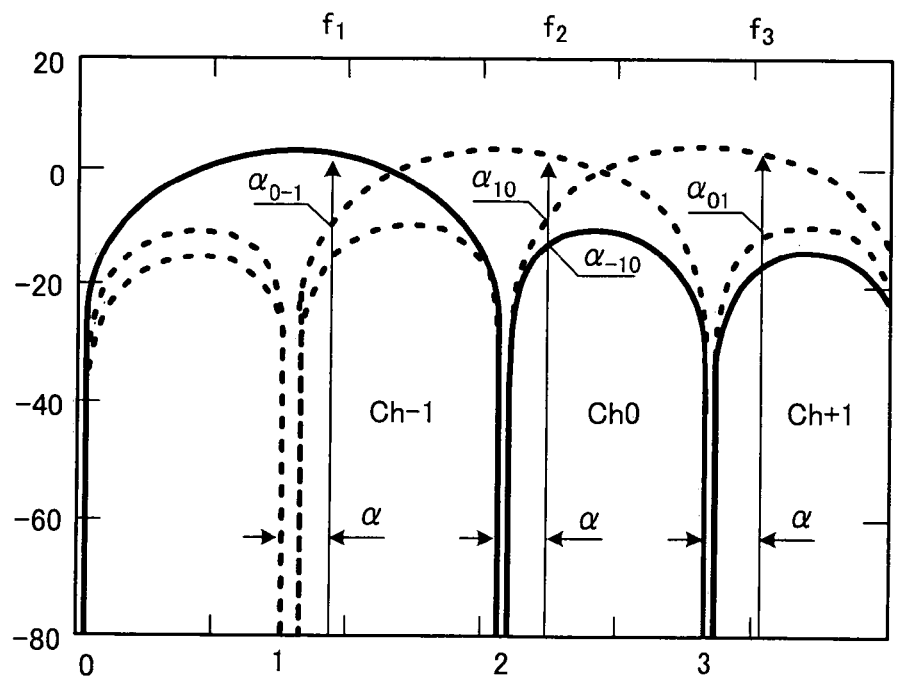
FIG. 2 shows the frequency characteristics when the frequency offset is not zero.
Figure 3:
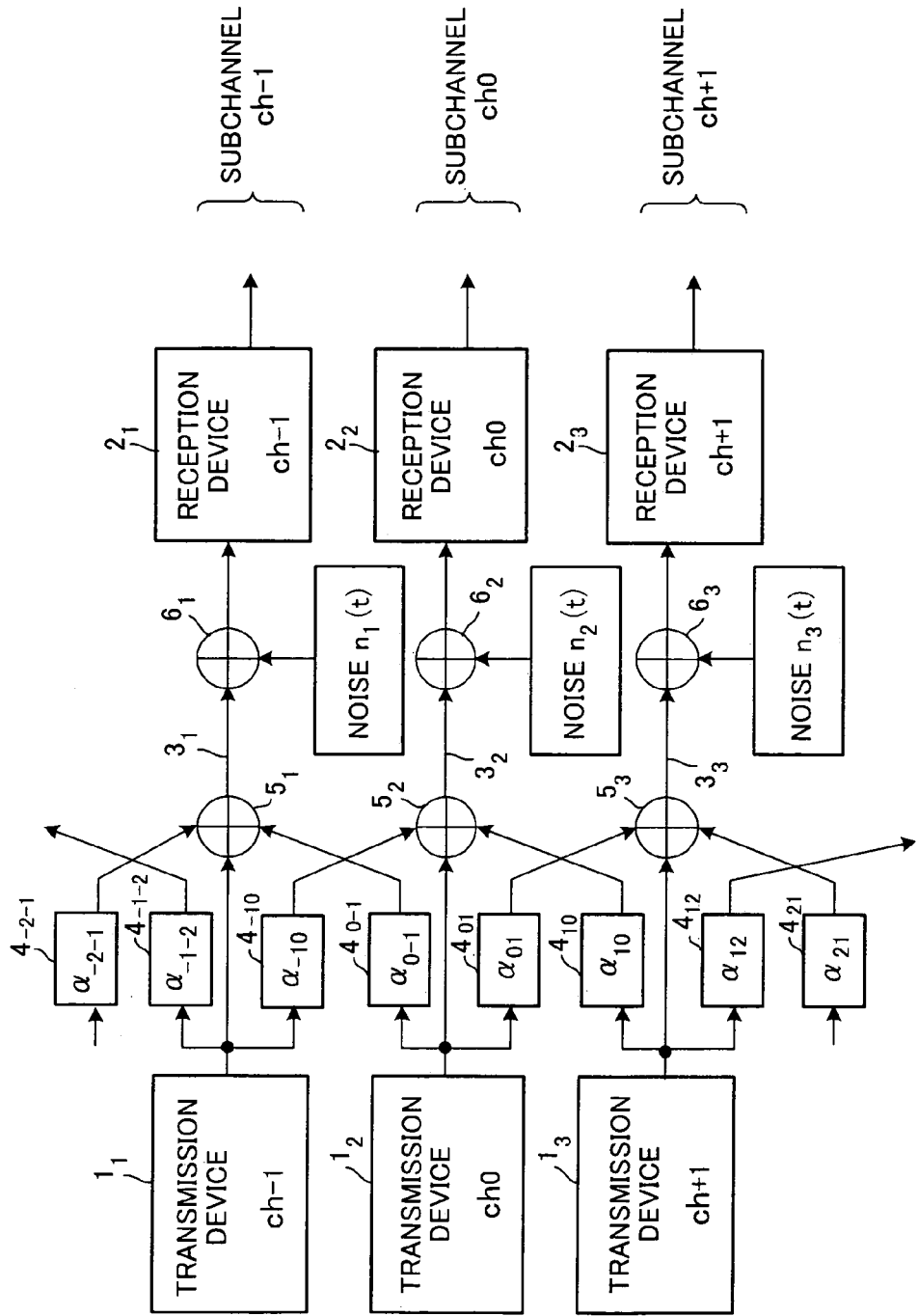
FIG. 3 is a general model used to explain a multicarrier communication system in which ICI exists.
Figure 4:
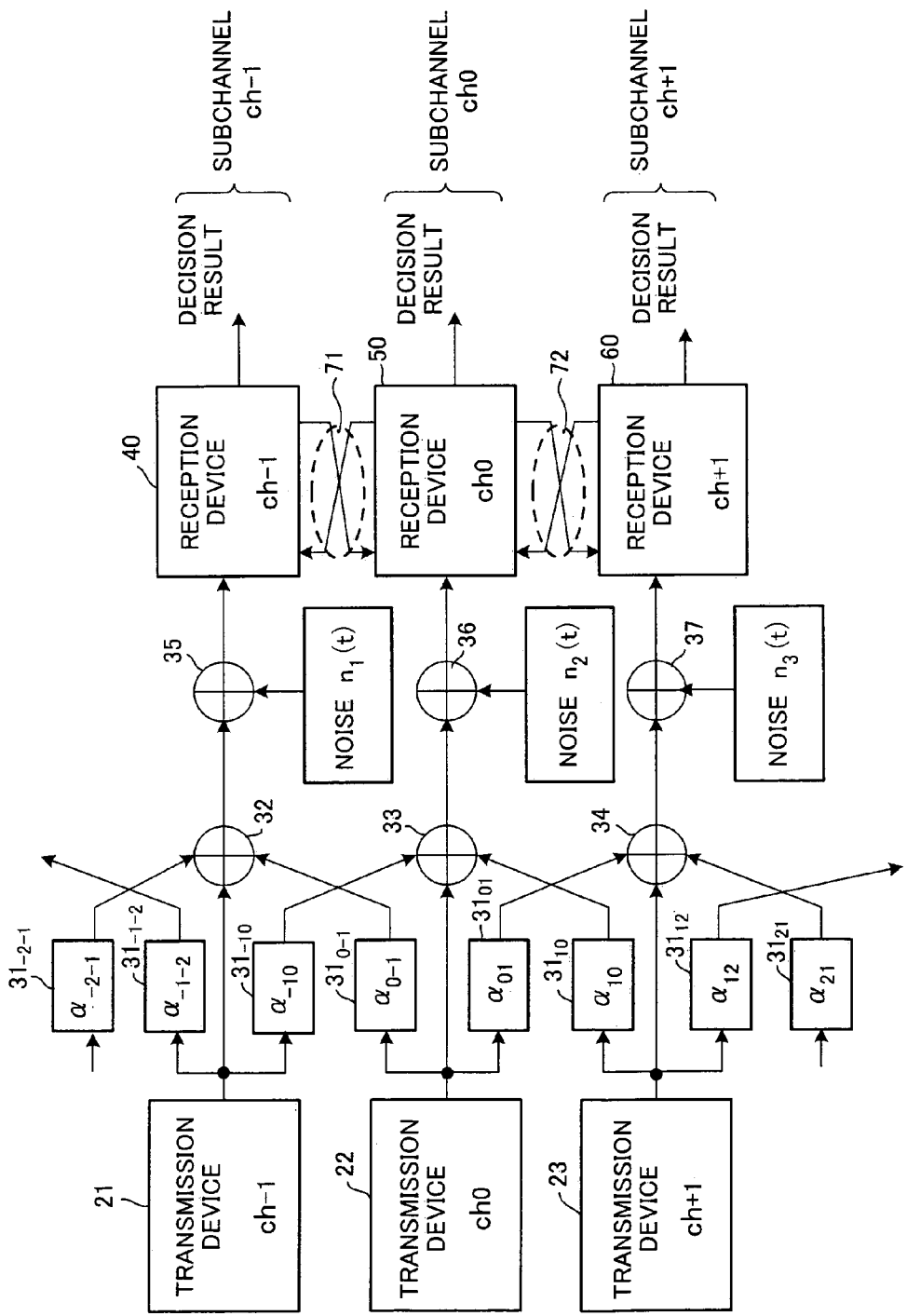
FIG. 4 shows the overall configuration of a communication system of this invention, in which interference between a subchannel of interest and the upper and lower two adjacent subchannels is utilized to demodulate data received in the subchannel of interest.

The algorithm used by the receiver of the subchannel of interest ch0 to demodulate received symbols in the communication system shown in FIG. 4 is explained.

The principle of the demodulation algorithm is derivation of the value ln D$_0$ indicating the difference between the posterior probability P(D$_0$=+1/y(t)) that an information symbol received in the subchannel of interest ch0 is "0" (=+1), and the posterior probability P(D$_0$=−1/y(t)) that the information symbol is "1" (=−1). This is because, if the difference in posterior probabilities ln D$_0$ can be derived, it is possible to decide whether the received information symbol is "0" or "1". That is, the probability difference ln D$_0$ for the subchannel of interest is the difference between the posterior probability P(D$_0$=+1/y(t)) that a received information symbol is "0" (=+1), and the posterior probability P(D$_0$=−1/y(t)) that the information symbol is "1" (=−1). Hence if ln D$_0$>0, the received information of the subchannel of interest can be decided as "0", and if ln D$_0$<0, the received information of the subchannel of interest can be decided as "1". From the above, in this invention, first the value ln D$_0$ indicating the difference in posterior probabilities is derived.

Suppose that binary information (two-valued information) is transmitted as signals $S^*_{ij}(t)$ over two adjacent subchannels. The index i in $S^*_{ij}(t)$ indicates the subchannel number (i=−1, 0, or 1), and the index j is determined by the sign of the information symbol Di in the subchannel i. That is, if $Di$=+1 then $j$=0 if $Di$=−1 then $j$=1       (1)

Hereafter, to simplify the notation, the time dependence of $S^*_{ij}(t)$ is omitted from equations. That is, $S^*_{ij}(t)$ shall be written simply as $S^*_{ij}$.

Suppose that the transmission symbols Di are statistically independent (have no correlation), and moreover are uniformly distributed random variables. From FIG. 4, signals in the subchannel of interest which have been affected by ICI from the lower and upper subchannels are represented by linear coupling due to crosstalk coefficients $\alpha$ between the signals $S^*_{-ij}$, $S^*_{ij}$ transmitted in the upper and lower subchannels, and the signals $S^*_{0j}$ in the channel of interest. Crosstalk coefficients $\alpha$ are values corresponding to crosstalk leakage. If the information symbol D$_0$ in the channel of interest is +1, the received signal S$_j$ (j=0–3) in the channel of interest is, according to whether the signals D$_{-1}$, D$_1$ in the lower and upper subchannels are +1 or −1, equal to $$\begin{cases} S_0 = S_{00}^* + \alpha_{-10} \cdot S_{-10}^* + \alpha_{10} \cdot S_{10}^*, D_0 = +1, D_{-1} = +1, D_1 = +1 \\ S_1 = S_{00}^* + \alpha_{-10} \cdot S_{-10}^* - \alpha_{10} \cdot S_{10}^*, D_0 = +1, D_{-1} = +1, D_1 = -1 \\ S_2 = S_{00}^* - \alpha_{-10} \cdot S_{-10}^* + \alpha_{10} \cdot S_{10}^*, D_0 = +1, D_{-1} = -1, D_1 = +1 \\ S_3 = S_{00}^* - \alpha_{-10} \cdot S_{-10}^* - \alpha_{10} \cdot S_{10}^*, D_0 = +1, D_{-1} = -1, D_1 = -1 \end{cases} \quad (2)$$

Here the j of the signal S$_j$ represents the signal number. Similarly, if an information symbol D$_0$ in the channel of interest is −1, then the received signal S$_j$ (j=4–7) in the channel of interest is, according to whether the signals D$_{-1}$, D$_1$ in the lower and upper subchannels are +1 or −1, equal to $$\begin{cases} S_4 = -S_{00}^* + \alpha_{-10} \cdot S_{-10}^* + \alpha_{10} \cdot S_{10}^* = -S_3, D_0 = -1, D_{-1} = +1, D_1 = +1 \\ S_5 = -S_{00}^* + \alpha_{-10} \cdot S_{-10}^* - \alpha_{10} \cdot S_{10}^* = -S_2, D_0 = -1, D_{-1} = +1, D_1 = -1 \\ S_6 = -S_{00}^* - \alpha_{-10} \cdot S_{-10}^* + \alpha_{10} \cdot S_{10}^* = -S_1, D_0 = -1, D_{-1} = -1, D_1 = +1 \\ S_7 = -S_{00}^* - \alpha_{-10} \cdot S_{-10}^* - \alpha_{10} \cdot S_{10}^* = -S_0, D_0 = -1, D_{-1} = -1, D_1 = -1 \end{cases} \quad (3)$$

After the introduction of ICI, $S_j$ (j=0, 1, 2, ..., 7) are used as eight signals input to the receivers for each subchannel, according to equations (2) and (3). The index j of $S_j$ in equations (2) and (3) indicates the signal number, and is determined by pairing symbols $D_{-1}$, $D_1$, and $D_0$ in the lower subchannel, upper subchannel, and in the channel of interest.

By taking the following facts (1) and (2) into consideration, the algorithm for optimal reception can be further extended. That is, (1) the signs of certain information signals are opposite, so that $S^*_{-10}=-S^*_{-11}$, $S^*_{00}=-S^*_{01}$, and $S^*_{10}=-S^*_{11}$. Further, (2) the same signals are used in the lower and upper subchannels and in the subchannel of interest in order to transmit information symbols, with $S^*_{-10}=S^*_{00}=S^*_{10}$ and $S^*_{-11}=S^*_{01}=S^*_{11}$. By taking these facts into account, the algorithm for optimal reception can be further extended. The latter (2) indicates that values are the same for all subchannels, and moreover that there are no differences in amplitude, waveform, energy, or similar between the information symbols for all subchannels. In this case, the signals of equations (2) and (3) for each of the subchannels are paired as shown below, and moreover have opposite signs.

$$\begin{cases} S_0 = S_{00}^* + \alpha_{-10} \cdot S_{-10}^* + \alpha_{10} \cdot S_{10}^* = -S_7 \\ S_1 = S_{00}^* + \alpha_{-10} \cdot S_{-10}^* - \alpha_{10} \cdot S_{10}^* = -S_6 \\ S_2 = S_{00}^* - \alpha_{-10} \cdot S_{-10}^* + \alpha_{10} \cdot S_{10}^* = -S_5 \\ S_3 = S_{00}^* - \alpha_{-10} \cdot S_{-10}^* - \alpha_{10} \cdot S_{10}^* = -S_4 \end{cases} \quad (4)$$

From equations (2), (3) and (4), the posterior probability of receiving the signal $S_j$, or in other words, the posterior probability that the received signal is $S_j$, $P(S_j/y(t))$, is given by the equation $$P[S_j / y(t)] = k_0 \cdot P_{apr}(S_j) \cdot P(y(t) / S_j) \quad (5)$$
$$= k_0 \cdot P_{apr}(S_j) \cdot \exp\left\{-\frac{1}{N_0} \int_0^T [y(t) - S_j]^2 dt\right\}$$

Here $k_0$ is a normalization constant, j is the signal number (j=0, 1, ..., 7), y(t) is the signal resultting from synthesis of the signal train $S_j$ accompanying ICI, and white Gaussian noise n(t) having a spectral power intensity $N_0$, $y(t)=S_j+n(t)$, $P_{apr}(S_j)$ is the prior probability of the received signal $S_j$, and $P(y(t)/S_j)$ is the conditional probability, which is the probability that the code word sent is $S_j$ when the received word is y(t).

The prior probabilities $P_{apr}(S_j)$ (j=0, 1, ..., 7) for the channel of interest are represented as the cross product of the prior probability that the signal in the channel of interest is $S^*_{00}$ or is $S^*_{01}$, and the posterior probabilities of the information signal $S^*_{ij}$ in the two adjacent subchannels. That is, when $D_0=+1$, $$\begin{cases} P_{apr}(S_0) = P(S_{-10}^*) \cdot P_{apr}(S_{00}^*) \cdot P(S_{10}^*) \\ P_{apr}(S_1) = P(S_{-10}^*) \cdot P_{apr}(S_{00}^*) \cdot P(S_{11}^*) \\ P_{apr}(S_2) = P(S_{-11}^*) \cdot P_{apr}(S_{00}^*) \cdot P(S_{10}^*) \\ P_{apr}(S_3) = P(S_{-11}^*) \cdot P_{apr}(S_{00}^*) \cdot P(S_{11}^*) \end{cases} \quad (6)$$

and when $D_0=-1$, $$\begin{cases} P_{apr}(S_4) = P(S_{-10}^*) \cdot P_{apr}(S_{01}^*) \cdot P(S_{10}^*) \\ P_{apr}(S_5) = P(S_{-10}^*) \cdot P_{apr}(S_{01}^*) \cdot P(S_{11}^*) \\ P_{apr}(S_6) = P(S_{-11}^*) \cdot P_{apr}(S_{01}^*) \cdot P(S_{10}^*) \\ P_{apr}(S_7) = P(S_{-11}^*) \cdot P_{apr}(S_{01}^*) \cdot P(S_{11}^*) \end{cases} \quad (7)$$

In equations (6) and (7), $P_{apr}(S_j)$ is the prior probability that the information signal $S_j$ with number j is transmitted in the subchannel of interest (transmission probability). The prior probability $P_{apr}(S^*_{ij})$ depends on the statistics of the data generation source, and in the most realistic case is assumed to be equal to ½. The probability $P(S^*_{ij})$ is the posterior probability of the received signal $S^*_{ij}$ differing from the prior probability $P_{apr}(S^*_{ij})$, the probability $P(S^*_{ij})$ can be estimated with high reliability on the receiving side, and is expressed by $P(S^*_{ij})=P(S^*_{ij}/y(t))$. This is the best estimate of $P(S^*_{ij})$ in a white Gaussian noise channel. From this assumption, equations (6) and (7) can be rewritten as follows.

$$\begin{cases} P_{apr}(S_0) = P(S_{-10}^* / y(t)) \cdot P_{apr}(S_{00}^*) \cdot P(S_{10}^* / y(t)) \\ P_{apr}(S_1) = P(S_{-10}^* / y(t)) \cdot P_{apr}(S_{00}^*) \cdot P(S_{11}^* / y(t)) \\ P_{apr}(S_2) = P(S_{-11}^* / y(t)) \cdot P_{apr}(S_{00}^*) \cdot P(S_{10}^* / y(t)) \\ P_{apr}(S_3) = P(S_{-11}^* / y(t)) \cdot P_{apr}(S_{00}^*) \cdot P(S_{11}^* / y(t)) \end{cases} \quad (8)$$

$$\begin{cases} P_{apr}(S_4) = P(S_{-10}^* / y(t)) \cdot P_{apr}(S_{01}^*) \cdot P(S_{10}^* / y(t)) \\ P_{apr}(S_5) = P(S_{-10}^* / y(t)) \cdot P_{apr}(S_{01}^*) \cdot P(S_{11}^* / y(t)) \\ P_{apr}(S_6) = P(S_{-11}^* / y(t)) \cdot P_{apr}(S_{01}^*) \cdot P(S_{10}^* / y(t)) \\ P_{apr}(S_7) = P(S_{-11}^* / y(t)) \cdot P_{apr}(S_{01}^*) \cdot P(S_{11}^* / y(t)) \end{cases} \quad (9)$$

Or, when a direct relation exists between the information signal $S^*_{ij}$ and the transmission information signal $D_i$ (see equation (1)), $P(S^*_{ij})=P(D_i=j/y(t))$ can be substituted into equations (6) and (7), so that equations (6) and (7) become as follows. Here $P(S^*_{ij})$ is the probability that the signal of the ith subchannel $D_i$ is j.

$$\begin{cases} P_{apr}(S_0) = P(D_{-1} = +1/y(t)) \cdot P_{apr}(S_{00}^*) \cdot P(D_1 = +1/y(t)) \\ P_{apr}(S_1) = P(D_{-1} = +1/y(t)) \cdot P_{apr}(S_{00}^*) \cdot P(D_1 = -1/y(t)) \\ P_{apr}(S_2) = P(D_{-1} = -1/y(t)) \cdot P_{apr}(S_{00}^*) \cdot P(D_1 = +1/y(t)) \\ P_{apr}(S_3) = P(D_{-1} = -1/y(t)) \cdot P_{apr}(S_{00}^*) \cdot P(D_1 = -1/y(t)) \end{cases} \quad (10)$$

$$\begin{cases} P_{apr}(S_4) = P(D_{-1} = +1/y(t)) \cdot P_{apr}(S_{01}^*) \cdot P(D_1 = +1/y(t)) \\ P_{apr}(S_5) = P(D_{-1} = +1/y(t)) \cdot P_{apr}(S_{01}^*) \cdot P(D_1 = -1/y(t)) \\ P_{apr}(S_6) = P(D_{-1} = -1/y(t)) \cdot P_{apr}(S_{01}^*) \cdot P(D_1 = +1/y(t)) \\ P_{apr}(S_7) = P(D_{-1} = -1/y(t)) \cdot P_{apr}(S_{01}^*) \cdot P(D_1 = -1/y(t)) \end{cases} \quad (11)$$

In equations (10) and (11), the prior probabilities $P_{apr}(S_j)$ (j=0, 1, 2, ..., 7) are expressed as the channel cross-products of the transmission prior probabilities $P_{apr}(S^*_{ij})$ of the information signal $S^*_{ij}$, and the posterior probabilities that the information symbols $D_i$ received in the lower and upper adjacent subchannels are +1 or −1.

In a turbo-receiver (maximum-likelihood receiver) of this invention, the sign of a received information symbol $D_0$ in the subchannel of interest is decided as follows. The probability $P(D_0=+1/y(t))$ that a received information symbol $D_0$ in the subchannel of interest (number 0) is +1, and the probability $P(D_0=-1/y(t))$ that $D_0$ is −1, are each computed, and by comparing the magnitudes of the two, or by comparing the difference in the logarithms of each with a threshold, the sign of the received information symbol $D_0$ is decided.

The posterior probability $P(D_0=j/y(t))$ that a received information symbol $D_0$ in the subchannel of interest is $j$ can be obtained as the posterior probability of receiving a symbol such that $D_0$ is $j$. Hence the posterior probability $P(D_0=+1/y(t))$ is the probability that a received information symbol $D_0$ in the subchannel of interest will be "0" (=+1), and can be computed as follows. From equations (1) and (2), signals transmitted as "0" (=+1) information symbols in the subchannel of interest are $S_0$ to $S_3$, so that the posterior probability $P(D_0=+1/y(t))$ that a received information symbol $D_0$ in the subchannel of interest will be "0" (=+1) will be the sum of the posterior probabilities of receiving the signals $S_0$ to $S_3$, and can be computed using equation (12a). Similarly, the posterior probability $P(D_0=-1/y(t))$ that a received information symbol $D_0$ in the subchannel of interest is "0" (=−1) can be computed from equation (12b).

$$\begin{cases} P(D_0 = +1/y(t)) = k \cdot [P(S_0/y(t)) + P(S_1/y(t)) + P(S_2/y(t)) + P(S_3/y(t))] \\ P(D_0 = -1/y(t)) = k \cdot [P(S_4/y(t)) + P(S_5/y(t)) + P(S_6/y(t)) + P(S_7/y(t))] \end{cases} \quad (12a) \\ (12b)$$

On applying equation (5) to (12a) (and taking $k_0=1$), equation (13) is obtained.

$$P(D_0 = +1/y(t)) = k \cdot [P_{apr}(S_0) \cdot P(y(t)/S_0) + P_{apr}(S_1) \cdot P(y(t)/S_1) + k \cdot [P_{apr}(S_2) \cdot P(y(t)/S_2) + P_{apr}(S_3) \cdot P(y(t)/S_3)] \quad (13)$$

And on applying equation (5) to (12b) (with $k_0=1$), equation (14) is obtained.

$$P(D_0 = -1/y(t)) = k \cdot [P_{apr}(S_4) \cdot P(y(t)/S_4) + P_{apr}(S_5) \cdot P(y(t)/S_5) + k \cdot [P_{apr}(S_6) \cdot P(y(t)/S_6) + P_{apr}(S_7) \cdot P(y(t)/S_7)] \quad (14)$$

Substituting equations (10) and (11) into (13) and (14) and simplifying, and omitting the $y(t)$ of $P(D_i=\pm 1/y(t))$ (that is, if $P(D_i=\pm 1/y(t))=P(D_i=\pm 1)$), then equations (15) and (16) are obtained.

$$P(D_0 = +1/y(t)) = k \cdot \begin{bmatrix} P(D_{-1} = +1) \cdot P_{apr}(S^*_{00}) \cdot P(D_1 = +1) \cdot P(y(t)/S_0) + \\ P(D_{-1} = +1) \cdot P_{apr}(S^*_{00}) \cdot P(D_1 = -1) \cdot P(y(t)/S_1) + \\ P(D_{-1} = -1) \cdot P_{apr}(S^*_{00}) \cdot P(D_1 = +1) \cdot P(y(t)/S_2) + \\ P(D_{-1} = -1) \cdot P_{apr}(S^*_{00}) \cdot P(D_1 = -1) \cdot P(y(t)/S_3) \end{bmatrix} \quad (15)$$

$$P(D_0 = -1/y(t)) = k \cdot \begin{bmatrix} P(D_{-1} = +1) \cdot P_{apr}(S^*_{01}) \cdot P(D_1 = +1) \cdot P(y(t)/S_4) + \\ P(D_{-1} = +1) \cdot P_{apr}(S^*_{01}) \cdot P(D_1 = -1) \cdot P(y(t)/S_5) + \\ P(D_{-1} = -1) \cdot P_{apr}(S^*_{01}) \cdot P(D_1 = +1) \cdot P(y(t)/S_6) + \\ P(D_{-1} = -1) \cdot P_{apr}(S^*_{01}) \cdot P(D_1 = -1) \cdot P(y(t)/S_7) \end{bmatrix} \quad (16)$$

Equation (15) is then modified to obtain equations (17a) and (17b).

$$P(D_0 = +1/y(t)) = k \cdot P_{apr}(S^*_{00}) \cdot [P(D_{-1} = +1) \cdot \quad (17a)$$

$$P(D_1 = +1) \cdot P(y(t)/S_0) +$$

$$P(D_{-1} = +1) \cdot P(D_1 = -1) \cdot$$

$$P(y(t)/S_1)] + k \cdot P_{apr}(S^*_{00}) \cdot$$

$$[P(D_{-1} = -1) \cdot P(D_1 = +1) \cdot P(y(t)/S_2) +$$

$$P(D_{-1} = -1) \cdot P(D_1 = -1) \cdot P(y(t)/S_3)]$$

$$P(D_0 = +1/y(t)) = k \cdot P_{apr}(S^*_{00}) \cdot [P(D_{-1} = +1) \cdot \quad (17b)$$

$$\{P(D_1 = +1) \cdot P(y(t)/S_0) +$$

$$P(D_1 = -1) \cdot P(y(t)/S_1)\}] +$$

$$k \cdot P_{apr}(S^*_{00}) \cdot [P(D_{-1} = -1) \cdot$$

$$\{P(D_1 = +1) \cdot P(y(t)/S_2) +$$

$$P(D_1 = -1) \cdot P(y(t)/S_3)\}]$$

Similarly, equation (16) is modified to obtain equations (18a) and (18b).

$$P(D_0 = -1/y(t)) = k \cdot P_{apr}(S^*_{01}) \cdot [P(D_{-1} = +1) \cdot \quad (18a)$$

$$P(D_1 = +1) \cdot P(y(t)/S_4) +$$

$$P(D_{-1} = +1) \cdot P(D_1 = -1) \cdot$$

$$P(y(t)/S_5)] + k \cdot P_{apr}(S^*_{00}) \cdot$$

$$[P(D_{-1} = -1) \cdot P(D_1 = +1) \cdot P(y(t)/S_6) +$$

$$P(D_{-1} = -1) \cdot P(D_1 = -1) \cdot P(y(t)/S_7)]$$

-continued $$P(D_0 = -1/y(t)) = k \cdot P_{apr}(S^*_{01}) \cdot [P(D_{-1} = +1) \cdot \quad (18b)$$

$$\{P(D_1 = +1) \cdot P(y(t)/S_4) +$$

$$P(D_1 = -1) \cdot P(y(t)/S_5)\}] +$$

$$k \cdot P_{apr}(S^*_{01}) \cdot [P(D_{-1} = -1) \cdot$$

$$\{P(D_1 = +1) \cdot P(y(t)/S_6) +$$

$$P(D_1 = -1) \cdot P(y(t)/S_7)\}]$$

From the above, if the posterior probabilities $P(D_0=+1/y(t))$ and $P(D_0=-1/y(t))$ with which a received information symbol $D_0$ in the subchannel of interest is "0" (=+1) and "1" (=-1) are computed, then by comparing the magnitudes, or by comparing the difference of their logarithms with a threshold value, the signal (+1 or -1) of the received information symbol can be decided.

Whether the information symbol $D_{10}$ of the subchannel of interest is +1 or -1 is judged by first computing $$\frac{P(D_0 = +1/y(t))}{P(D_0 = -1/y(t))}$$

and then using equations (19a) and (19b) to make a judgment. That is, if $$\frac{P(D_0 = +1/y(t))}{P(D_0 = -1/y(t))} \quad (19a)$$

then it is judged that $D_0=+1$, and if $$\frac{P(D_0 = +1/y(t))}{P(D_0 = -1/y(t))} \quad (19b)$$

then it is judged that $D_0=-1$.

Whether the information symbol $D_{10}$ of the subchannel of interest is +1 or -1 is judged by first computing $$\ln P(D_0=+1/y(t)) - \ln P(D_0=-1/y(t))$$

(where ln is the base-e logarithm), and then making a judgment according to the sign. That is, if $$\ln P(D_0=+1/y(t)) - \ln P(D_0=-1/y(t)) > 0 \quad (19c)$$

then it is judged that $D_0=+1$, and if $$\ln P(D_0=+1/y(t)) - \ln P(D_0=-1/y(t)) < 0 \quad (19d)$$

then it is judged that $D_0=-1$.

Because transmission symbols $D_0$ are statistically independent (have no correlation) and are uniformly distributed random variables, the following equation obtains.

$$\begin{cases} P_{apr}(S^*_{-10}) = P_{apr}(S^*_{00}) = P_{apr}(S^*_{+10}) = 1/2 \\ P_{apr}(S^*_{-11}) = P_{apr}(S^*_{01}) = P_{apr}(S^*_{+11}) = 1/2 \end{cases} \quad (20)$$

From equation (20), and because the common multiplier in equations (17b) and (18b) does not affect the judgment rule, equations (17b) and (18b) can be rewritten as equations (21) and (22).

$$P(D_0=+1/y(t))=P(D_{-1}=+1)\cdot\{P(D_1=+1)\cdot P(y(t)/S_0)+ \\ P(D_1=-1)\cdot P(y(t)/S_1)\}+P(D_{-1}=-1)\cdot\{P(D_1=+1)\cdot \\ P(y(t)/S_2)+P(D_1=-1)\cdot P(y(t)/S_3)\} \quad (21)$$

$$P(D_0=-1/y(t))=P(D_{-1}=+1)\cdot\{P(D_1=+1)\cdot P(y(t)/S_4)+ \\ P(D_1=-1)\cdot P(y(t)/S_5)\}+P(D_{-1}=-1)\cdot\{P(D_1=+1)\cdot \\ P(y(t)/S_6)+P(D_1=-1)\cdot P(y(t)/S_7)\} \quad (22)$$

Considering the algebraic identity of the following equation, $$\ln(e^X + e^Y) = \frac{X+Y}{2} + \ln 2 + \ln\cosh\left(\frac{X-Y}{2}\right) \quad (a)$$

the equations (21), (22) can be modified to obtain the following equations (23) and (24).

$$\ln P(D_0 = +1/y(t)) = 1/2 \cdot \ln P(D_{-1} = +1) + 1/2 \cdot \ln \cdot \{P(D_1 = +1) \cdot P(y(t)/S_0) + P(D_1 = -1) \cdot P(y(t)/S_1)\} + \\ 1/2 \cdot \ln P(D_{-1} = -1) + 1/2 \cdot \ln\{P(D_1 = +1) \cdot P(y(t)/S_2) + P(D_1 = -1) \cdot P(y(t)/S_3)\} + \ln 2 + \\ \ln\cosh\left\{\begin{matrix} 1/2 \cdot \ln P(D_{-1} = +1) + 1/2 \cdot \ln\{P(D_1 = +1) \cdot P(y(t)/S_0) + P(D_1 = -1) \cdot P(y(t)/S_1)\} - \\ 1/2 \cdot \ln P(D_{-1} = -1) + 1/2 \cdot \ln\{P(D_1 = +1) \cdot P(y(t)/S_2) + P(D_1 = +1) \cdot P(y(t)/S_3)\} \end{matrix}\right\} \quad (23)$$

$$\ln P(D_0 = -1/y(t)) = 1/2 \cdot \ln P(D_{-1} = +1) + 1/2 \cdot \ln \cdot \{P(D_1 = +1) \cdot P(y(t)/S_4) + P(D_1 = -1) \cdot P(y(t)/S_5)\} + \\ 1/2 \cdot \ln P(D_{-1} = -1) + 1/2 \cdot \ln\{P(D_1 = +1) \cdot P(y(t)/S_6) + P(D_1 = -1) \cdot P(y(t)/S_7)\} + \ln 2 + \\ \ln\cosh\left\{\begin{matrix} 1/2 \cdot \ln P(D_{-1} = +1) + 1/2 \cdot \ln\{P(D_1 = +1) \cdot P(y(t)/S_4) + P(D_1 = -1) \cdot P(y(t)/S_5)\} - \\ 1/2 \cdot \ln P(D_{-1} = -1) + 1/2 \cdot \ln\{P(D_1 = +1) \cdot P(y(t)/S_6) + P(D_1 = +1) \cdot P(y(t)/S_7)\} \end{matrix}\right\} \quad (24)$$

Here, by employing the following equations (25) and (26), $$\ln P(D_0 = +1/y(t)) = \frac{A+B}{2} + \ln 2 + \ln\cosh\left(\frac{A-B}{2}\right) \quad (25)$$

$$\ln P(D_0 = -1/y(t)) = \frac{C+D}{2} + \ln 2 + \ln\cosh\left(\frac{C-D}{2}\right) \quad (26)$$

A, B, C, and D then become as follows.

$$A = \ln P(D_{-1}=+1) + \ln \{P(D_1=+1) \cdot P(y(t)/S_0) + \\ P(D_1=-1) \cdot P(y(t)/S_1)\}$$

$$B = \ln P(D_{-1}=-1) + \ln \{P(D_1=+1) \cdot P(y(t)/S_2) + \\ P(D_1=-1) \cdot P(y(t)/S_3)\}$$

$$C = \ln P(D_{-1}=+1) + \ln \{P(D_1=+1) \cdot P(y(t)/S_4) + \\ P(D_1=-1) \cdot P(y(t)/S_5)\}$$

$$D = \ln P(D_{-1}=-1) + \ln \{P(D_1=+1) \cdot P(y(t)/S_6) + \\ P(D_1=-1) \cdot P(y(t)/S_7)\}$$

Applying equations (25) and (26) to the judgment expressions on the left-hand sides of equations (19a) and (19b), the new judgment equation $$\ln D_0 = \frac{A+B}{2} - \frac{C+D}{2} + \ln\cosh\left(\frac{A-B}{2}\right) - \ln\cosh\left(\frac{C-D}{2}\right) >/< 0 \quad (27)$$

is obtained. By taking into consideration the relation obtained from equation (5), $$P(y(t)/S_j) = \exp\left\{-\frac{1}{N_0}\int_0^T [y(t)-S_j]^2 dt\right\}$$

as well as equation (4), each of the terms of the new judgment equation (27) can be rewritten as follows. Here, $\ln D_i = \ln P(D_i = +1) - \ln P(D_i = -0.1)$.

$$(A+B) - (C+D) = \frac{2}{N_0}\left[\int_0^T y(t)\cdot S_0(t)dt + \int_0^T y(t)\cdot S_1(t)dt + \int_0^T y(t)\cdot S_2(t)dt + \int_0^T y(t)\cdot S_3(t)dt\right] + \quad (28)$$

$$\ln\cosh\left\{1/2\cdot\left\{\ln D_1 + \frac{2}{N_0}\left[\int_0^T y(t)\cdot S_0(t)dt - \int_0^T y(t)\cdot S_1(t)dt\right] - \frac{E_0-E_1}{N_0}\right\}\right\} - \ln\cosh\left\{1/2\cdot\left\{\ln D_1 + \frac{2}{N_0}\left[\int_0^T y(t)\cdot S_0(t)dt - t\right] + \frac{E_0-E_1}{N_0}\right\}\right\} + \ln\cosh$$

$$\left\{1/2\cdot\left\{\ln D_1 + \frac{2}{N_0}\left[\int_0^T y(t)\cdot S_2(t)dt - \int_0^T y(t)\cdot S_3(t)dt\right] - \frac{E_2-E_3}{N_0}\right\}\right\} - \ln\cosh$$

$$\left\{1/2\cdot\left\{\ln D_1 + \frac{2}{N_0}\left[\int_0^T y(t)\cdot S_2(t)dt - \int_0^T y(t)\cdot S_3(t)dt\right] + \frac{E_2-E_3}{N_0}\right\}\right\}$$

In the above, $\ln D_i = \ln P(D_i=+1/y(t)) - \ln P(D_i=-1/y(t))$ is the difference between the logarithms of the posterior probabilities that the signal $D_i$ transmitted in the ith subchannel is +1 and −1 (soft decision value for the ith subchannel). Further, suppose that the energy $E_j$ of the signal $S_j(t)$ is $$E_j = \int_0^T S_j^2(t)dt$$

Also, (A-B) and (C-D) in equation (27) are as follows.

$$(A-B) = \ln D_{-1} + 1/2\cdot\left\{\frac{2}{N_0}\left[\int_0^T y(t)\cdot S_0(t)dt + \int_0^T y(t)\cdot S_1(t)dt - \int_0^T y(t)\cdot S_2(t)dt - \int_0^T y(t)\cdot S_3(t)dt\right] - \frac{\Delta E_\Sigma}{N_0} + \ln\cosh\left\{1/2\cdot\left\{\ln D_1 + \frac{2}{N_0}\left[\int_0^T y(t)\cdot S_0(t)dt - \int_0^T y(t)\cdot S_1(t)dt\right] - \frac{E_0-E_1}{N_0}\right\}\right\} - \ln\cosh\left\{1/2\cdot\left\{\ln D_1 + \frac{2}{N_0}\left[\int_0^T y(t)\cdot S_2(t)dt - \int_0^T y(t)\cdot S_3(t)dt\right] + \frac{E_2-E_3}{N_0}\right\}\right\}\right\} \quad (29)$$

$$(C-D) = \ln D_{-1} + 1/2\cdot\left\{\frac{2}{N_0}\left[\int_0^T y(t)\cdot S_0(t)dt + \int_0^T y(t)\cdot S_1(t)dt - \int_0^T y(t)\cdot S_2(t)dt - \int_0^T y(t)\cdot S_3(t)dt\right] + \frac{\Delta E_\Sigma}{N_0} + \ln\cosh\left\{1/2\cdot\left\{\ln D_1 + \frac{2}{N_0}\left[\int_0^T y(t)\cdot S_2(t)dt - \int_0^T y(t)\cdot S_3(t)dt\right] - \frac{E_2-E_3}{N_0}\right\}\right\} - \ln\cosh\left\{1/2\cdot\left\{\ln D_1 + \frac{2}{N_0}\left[\int_0^T y(t)\cdot S_0(t)dt - \int_0^T y(t)\cdot S_1(t)dt\right] + \frac{E_0-E_1}{N_0}\right\}\right\}\right\} \quad (30)$$

Here $$\Delta E_\Sigma = \frac{(E_0-E_1)=(E_2+E_3)}{N_0}$$

Equations (27) through (30) define the optimum receiver structure for binary signals accompanying ICI. As is seen from equations (27) through (30), when judging the sign of an information symbol D transmitted in a certain subchannel, the judgment information of the adjacent channels is used. In the judgment rules of equations (27) through (30), $\ln D_{-1}$ and $\ln D_{+1}$ represent the difference in logarithms of the posterior probabilities that the information symbol is +1 in the lower subchannel (ch−1) and in the upper subchannel (ch+1), respectively. All calculations are serial calculations, so that during data processing for the subchannel of interest, the most recent posterior probabilities from adjacent subchannels obtained through repeated calculations can be used.

Thus an algorithm is created in which $\ln D_0$, which is the soft decision value, is computed using equations (27) through (30), and thereafter the sign of the soft decision value $\ln D_0$ is used to judge whether the received symbol in the subchannel of interest is "0" or "1".

(C) Configuration of a Receiver Device of this Invention

Figure 5:
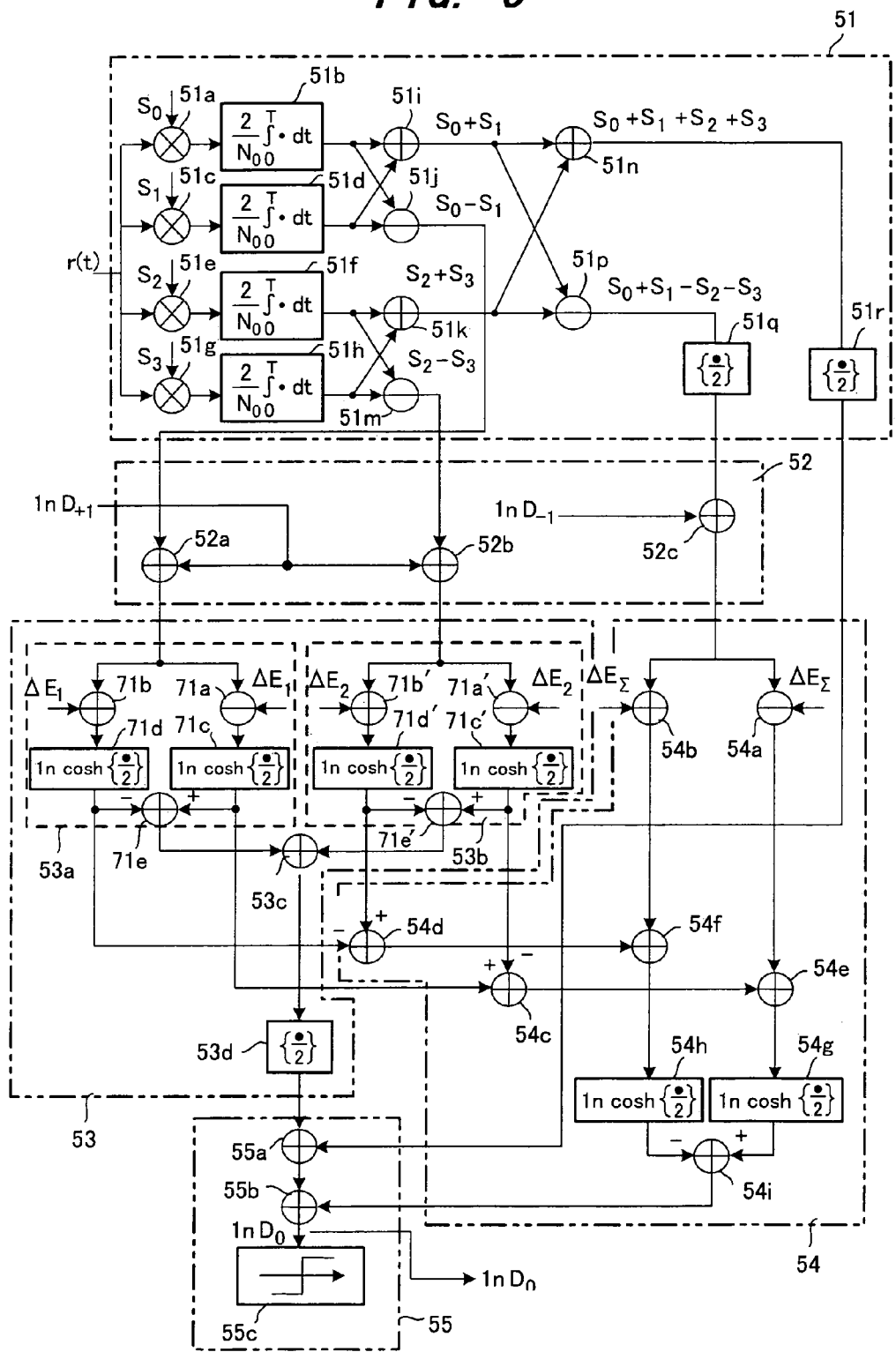
FIG. 5 shows the configuration of a reception device (called a turbo-receiver), based on maximum posterior probability utilizing ICI, of this invention.

FIG. 5 shows the reception of a reception device, that is, a reception device based on maximum posterior probabilities using ICI (called a turbo-receiver), and shows the configuration of only the reception portion for the subchannel of interest; the reception portions for other subchannels have the same configuration. This reception portion comprises a configuration for execution of the above-described algorithm.

Broadly, the reception device 50 for the subchannel of interest comprises a correlation unit (which may be a matched filter) 51, an other-channel judgment result application portion 52, first and second nonlinear units 53 and 54, and a symbol judgment portion 55.

The multiplier 51*a* and integrator 51*b* of the correlation unit 51 are portions which compute the quantity $$\frac{2}{N_0} \int_o^T y(t) \cdot S_0(t) dt$$

in equations (28) through (30); the multiplier 51*c* and integrator 51*d* are portions which compute the quantity $$\frac{2}{N_0} \int_o^T y(t) \cdot S_1(t) dt$$

the multiplier 51*e* and integrator 51*f* are portions which compute the quantity $$\frac{2}{N_0} \int_o^T y(t) \cdot S_2(t) dt$$

and the multiplier 51*g* and integrator 51*h* are portions which compute the quantity $$\frac{2}{N_0} \int_o^T y(t) \cdot S_3(t) dt$$

The addition portion 51*i* adds the integration outputs of the integrators 51*b* and 51*d*, the subtraction portion 51*j* subtracts the integration outputs of the integrators 51*b* and 51*d*, the addition portion 51*k* adds the integration outputs of the integrators 51*f* and 51*h*, and the subtraction portion 51*m* subtracts the integration outputs of the integrators 51*f*, 51*h*. The addition portion 51*n* adds the outputs of the addition portions 51*i* and 51*k* and outputs the first term on the right side of equation (28), $$\frac{2}{N_0} \int_0^T y(t) \cdot S_0(t) dt + \frac{2}{N_0} \int_0^T y(t) S_1(t) dt + \frac{2}{N_0} \int_0^T y(t) S_2(t) dt + \frac{2}{N_0} \int_0^T y(t) S_3(t)) dt$$

The subtraction portion 51*p* subtracts the outputs of the subtraction portions 51*i* and 51*k* and outputs $$\frac{2}{N_0} \int_0^T y(t) \cdot S_0(t) dt + \frac{2}{N_0} \int_0^T y(t) S_1(t) dt - \frac{2}{N_0} \int_0^T y(t) S_2(t) dt - \frac{2}{N_0} \int_0^T y(t) S_3(t)) dt$$

The division portions 51*q* and 51*r* divide the input signals by two and output the results.

The other-channel judgment result application portion 52 comprises adders 52*a* to 52*c*, which respectively compute the quantities $$\ln D_{+1} + \frac{2}{N_0} \int_0^T y(t) \cdot S_0(t) dt - \frac{2}{N_0} \int_0^T y(t) S_1(t) dt,$$

$$\ln D_{+1} + \frac{2}{N_0} \int_0^T y(t) \cdot S_2(t) dt - \frac{2}{N_0} \int_0^T y(t) S_3(t) dt,$$

$$\ln D_{-1} + \frac{2}{N_0} \int_0^T y(t) \cdot S_0(t) dt + \frac{2}{N_0} \int_0^T y(t) S_1(t) dt - \frac{2}{N_0} \int_0^T y(t) S_2(t) dt - \frac{2}{N_0} \int_0^T y(t) S_3(t)) dt$$

The first nonlinear unit 53 is a portion which performs the computation of ln cosh in the second through fifth terms on the right side of equation (28), and has first and second nonlinear portions 53*a* and 53*b*. The addition portions 71*a*, 71*b* of the first nonlinear portion 53*a* respectively compute the contents of the square brackets ([ ]) in the first and second terms on the right of equation (28); here $(E_0-E_1)/N_0=\Delta E_1$. The ln cosh computation portions 71*c*, 71*d* respectively compute the second and third terms on the right in equation (28), and the subtractor 71*e* subtracts the computation result of the ln cosh computation portion 71*d* from the computation result of the ln cosh computation portion 71*c* and outputs the result.

The addition portions 71*a*', 71*b*' of the second nonlinear portion 53*b* respectively compute the contents of the curly brackets ({ }) in the fourth and fifth terms on the right in equation (28); here, $(E_2-E_3)/N_0=\Delta E_2$. The ln cosh computation portions 71*c*', 71*d*' respectively compute the fourth and fifth terms on the right in equation (28), and the subtractor 71*e*' subtracts the computation result of the ln cosh computation portion 71*d*' from the computation result of the ln cosh computation portion 71*c*', and outputs the result.

The addition portion 53*c* synthesizes the outputs of the adders 71*e*, 71*e*', and the division portion 53*d* divides the synthesized signal by 2 and outputs the result of computation of the second through fifth terms on the right in equation (28).

The second nonlinear unit 54 is a portion which computes the first through third terms on the right in equations (29) and (30). The addition portions 54*a*, 54*b* respectively compute the first term on the right in equations (29) and (30), the addition portions 54*c*, 54*d* respectively compute the second and third terms on the right in equations (29) and (30), the addition portions 54*e*, 54*f* respectively compute the right-hand side of equations (29) and (30), the ln cosh computation portions 54*g*, 54*h* compute the quantities $$\ln \cosh \frac{A-B}{2}, \ln \cosh \frac{C-D}{2}$$

and the subtraction portion 54*i* computes the difference of the outputs of the ln cosh computation portions 54*g*, 54*h*, $$\ln \cosh \frac{A-B}{2} - \ln \cosh \frac{C-D}{2}$$

and outputs the result.

The adder 55a of the symbol judgment portion 55 adds the output signal of the division portion 51r of the correlation unit 51 and the output signal of the nonlinear unit 53, and outputs $$\frac{A-B}{2} - \frac{C-D}{2}$$

and the addition portion 55b generates the ln $D_0$ (soft decision value) of equation (27). The judgment portion 55c judges the sign of ln $D_0$, and if positive decides that the received symbol is "0", but if negative decides that the symbol is "1". The symbol judgment portion 55 also feeds back the computation result of equation (27) for (the soft decision value) ln $D_0$ to the other-channel judgment result application portions of the reception portions 40, 60 of the lower and upper adjacent subchannels.

(D) Similarity to a Turbo-Decoder

The above-described received data demodulation algorithm of this invention is similar to a turbo-decoder for turbo codes, described in M. C. Valeniti and B. D. Woerner, "Variable latency turbo codes for wireless multimedia applications", Proc. Int. Symposium on Turbo codes and Related Topics, Brest, France, September 1997, pp. 216-219.

Due to similarity with turbo-decoder, the algorithm of this invention is called a turbo-receiver. In a turbo-decoder, each decoder passes information to other decoders, and uses information obtained from other decoders to refine posterior probabilities, estimated in order. Similarly, in the algorithm of this invention, information obtained from one subchannel is subjected to nonlinear processing, and is then used to refine the posterior probabilities estimated for other channels; again similarly, information obtained from these other subchannels is used to refine the posterior probabilities estimated for the one subchannel. If in the turbo-decoder the individual decoder outputs are in hard bit decision (hard decision) format, then sharing of information holds only very slight benefits. Hard bit decisions are similar to the decision feedback equalizer previously proposed in Viterbo and K. Fazel, "How to combat long echoes in QFDM transmission schemes: Subchannel equalization or more powerful channel coding", Proc. IEEE Globecom '95, Singapore, November 1995, pp. 2069-2074, for ICI cancellation. However, a turbo-decoder output is in soft decision format. Similarly, the outputs ln $D_{-1}$, ln $D_0$, ln $D_1$ of the reception devices 40 to 60 for subchannels in this invention are soft decision format values (soft decision values), and hard decisions are made after the end of repeated calculations.

These structural similarities are for the following reasons. In a turbo-receiver, similarly to the case of turbo codes, the existence of ICI means there is transmission over subchannels in which the same information has uncorrelated noise. Depending on the behavior of this uncorrelated noise, estimates of posterior probabilities (or the reliability of decisions) can be improved by using the estimated posterior probabilities derived from other subchannels.

Similarly to a repeating turbo-decoder, the algorithm of this invention is repeated one or more times for received information prior to the final decision. When the initial step, that is, using decisions from other subchannels is not possible, if the data is uniformly distributed random variables, it is possible to set $P(D_{-1}=+1/y(t))=P(D_{-1}=1/y(t))=½$ and $P(D_1=+1/y(t))=P(D_1=-1/y(t))=½$ for the first subchannel. This setting is the best setting. Consequently in the first step, the difference ln $D_{-1}$ in posterior probabilities in the lower subchannel ch-1 is supposed to be zero. By similarly considering the upper subchannel, setting $P(D_1=+1/y(t))=½$, $P(D_1=-1/y(t))=½$, the difference ln $D_1$ in posterior probabilities is again zero. By computing equations (27) to (30) with ln $D_{-1}$=ln $D_1$=0, an initial estimate can be obtained for ln $D_0$, which had been unknown. Similarly, by means of the algorithm of this invention during the initial iteration in a communication system with N subchannels, for the lower subchannel it is assumed that ln $D_{-2}$=ln $D_0$=0 to compute ln $D_{-1}$, and for the upper subchannel it is assumed that ln $D_2$=ln $D_0$=0 to compute ln $D_1$. In the second step, the ln $D_{-1}$, ln $D_1$ obtained in the preceding step are applied to the decision equations (27) to (30) to compute new estimated values of posterior probabilities for the subchannel of interest. By this means, the output of one subchannel receiver can be used as a prior probability in other receivers.

Figure 6:
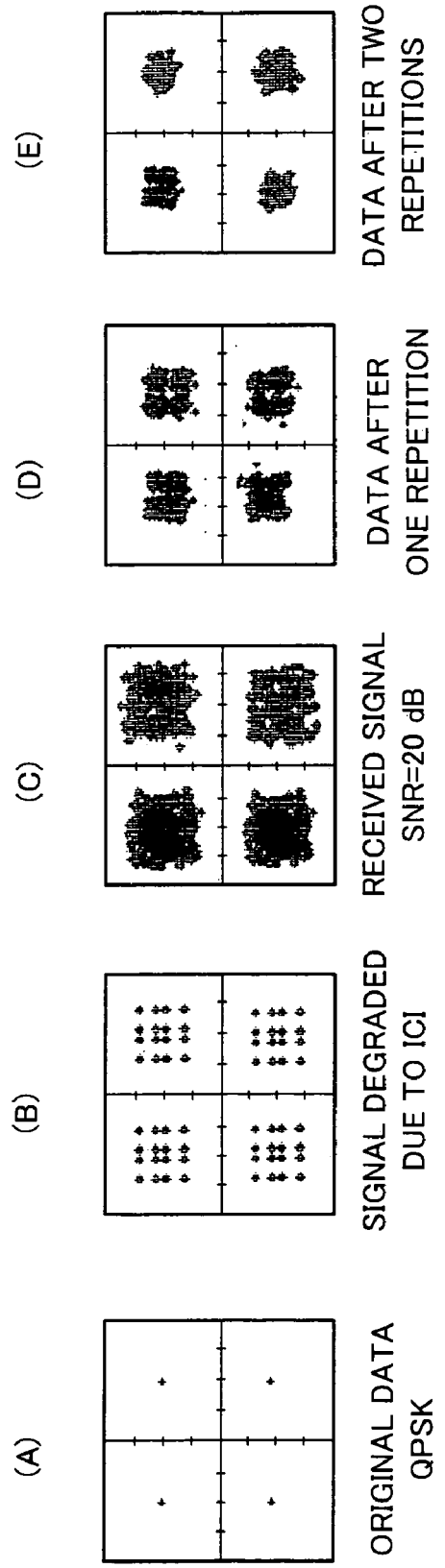
FIG. 6 is an explanatory diagram of constellations of the subchannel of interest in each of the portions of the communication system, and constellations of the subchannel of interest according to the number of repetitions.

FIG. 6 is an explanatory diagram of the constellation of the subchannel of interest in an N=64 communication system, for a case in which. QPSK modulation is performed with an S/N ratio of 20 dB after different numbers of repetitions. Cross-channel leakage coefficients are assumed to be $\alpha_{0-1}$=0.25, $\alpha_{01}$=0.15. The constellations shown are for (A) the original QPSK modulated data; (B) the signal after degradation by ICI; (C) the signal received with an S/N of 20 dB; (D) the data received after one repetition of the algorithm of this invention; and (E) the data received after two repetitions of the algorithm of this invention.

From this it is concluded that by means of the present invention, constellation scattering is reduced and the BER is improved to a smaller value. Also, the greater the number of repetitions, the smaller still the constellation scattering can be made, and the BER is improved still further.

(E) Nonlinear Units

In FIG. 5, the energy difference $\Delta E_1$ between the signals $S_0(t)$ and $S_1(t)$ and the energy difference $\Delta E_2$ between the signals $S_2(t)$ and $S_3(t)$, normalized by the spectral power intensity $N_0$ of white Gaussian noise, as well as the $\Delta E\Sigma$ of equation (31) are introduced to realize a receiver device. $\Delta E_1$ is the difference between the energy when the information symbols $D_{-1}$, $D_0$, $D_1$ of the respective channels ch-1, ch0, ch1 are "+1, +1, +1" (energy of signal $S_1(t)$) and the energy when they are "+1, +1, -1" (energy of signal $S_1(t)$).

Figure 7:
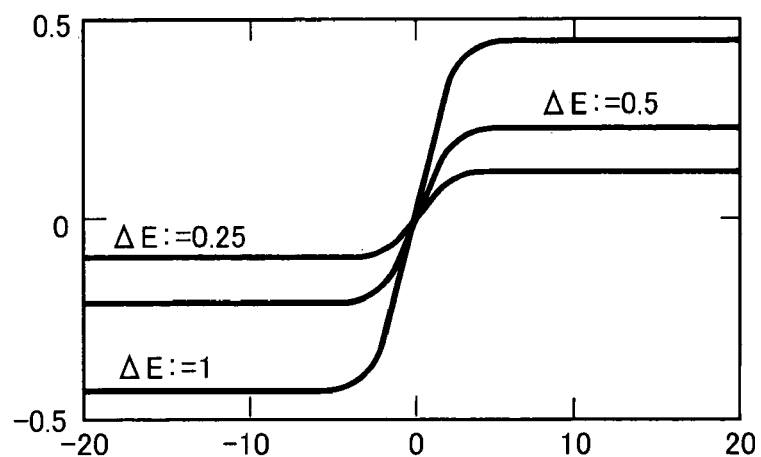
FIG. 7 shows the transfer function of a nonlinear unit.

The nonlinear units 53a, 53b, 54 of FIG. 5 can be represented as limiters having a nonlinear transfer function shown in FIG. 7.

In other words, the nonlinear units 53a, 53b, 54 have negative amplitude limits for negative input and positive amplitude limits for positive input, and moreover can be approximated by a limiter having a substantially linear input-output relation on both sides of zero input. The limit level depends on the S/N ratio and on the energy differences $\Delta E_1$, $\Delta E_2$, $\Delta E\Sigma$. FIG. 7 shows transfer functions of a nonlinear unit taking $\Delta E$ as a parameter.

By approximating nonlinear units by a limiter having a characteristic shown in FIG. 7, the configuration is made simple, and the nonlinear unit computations are facilitated.

(F) Noise Immunity and Simulation Results

Figure 8:
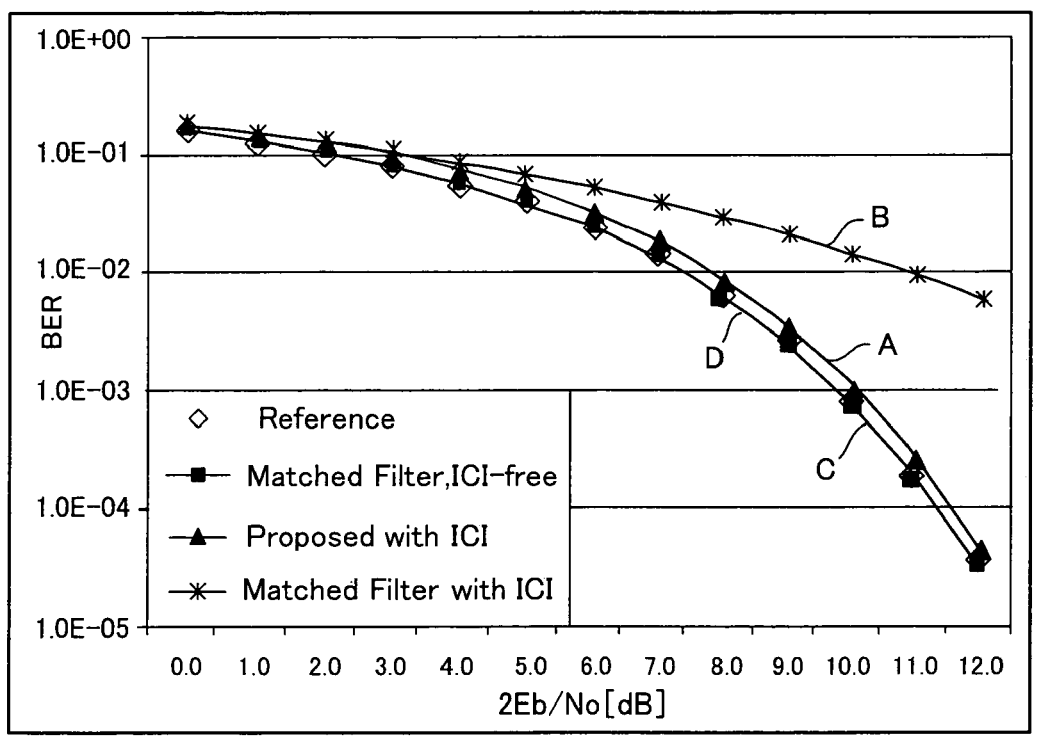
FIG. 8 shows the mean BER performance characteristic of a receiver of this invention and of a conventional matched-filter receiver when $\alpha_{01}=\alpha_{0-1}=0.25$.

In order to verify the validity of the nonlinear signal processing of this invention, computer simulations of a receiver of this invention and of a classical matched-filter receiver were performed. FIG. 8 shows the mean BER performance characteristic of a receiver of this invention and of a conventional matched-filter receiver when $\alpha_{01}$=$\alpha_{0-1}$=0.25, shown as a function of $2Eb/N_0$ (see simulation results A and B). $Eb/N_0$ is the ratio of the mean received signal energy Eb to the background noise power spectral intensity $N_0$ per bit. For reference, simulation results (C) for a receiver of this invention (equivalent to a conventional matched-filter receiver) for the case in which ICI does not exist and $\alpha_{01}=\alpha_{0-1}=0$ are shown in FIG. 8. Also as reference, BER simulation results (D) for a matched filter receiver when ICI does not exist, calculated using equation (32), are also shown.

$$P_{err} = \frac{1}{2} \cdot erfc\left(\sqrt{0.5 \cdot SNR}\right) \quad (32)$$

Here $$erfc(x) = 1 - erf(x) = \frac{2}{\sqrt{\pi}} \int_x^\infty e^{-t^2} dt$$

The BER performance obtained through computer simulations and the BER performance calculated using equation (32) are in considerably good agreement. As is clear from the plot of FIG. 8, if no ICI exists, the BER of a receiver of this invention is no different from the BER obtained from equation (32) for a conventional matched-filter receiver. The BER of the latter is shown in FIG. 8 as "Reference". When ICI exists (in the case $\alpha_{01}=\alpha_{0-1}=0.25$), the performance of a conventional device which does not perform nonlinear processing is inferior to that of a receiver of this invention, and from the simulation results it is clear that the difference is prominent for a high $Eb/N_0$ in particular.

Figure 9:
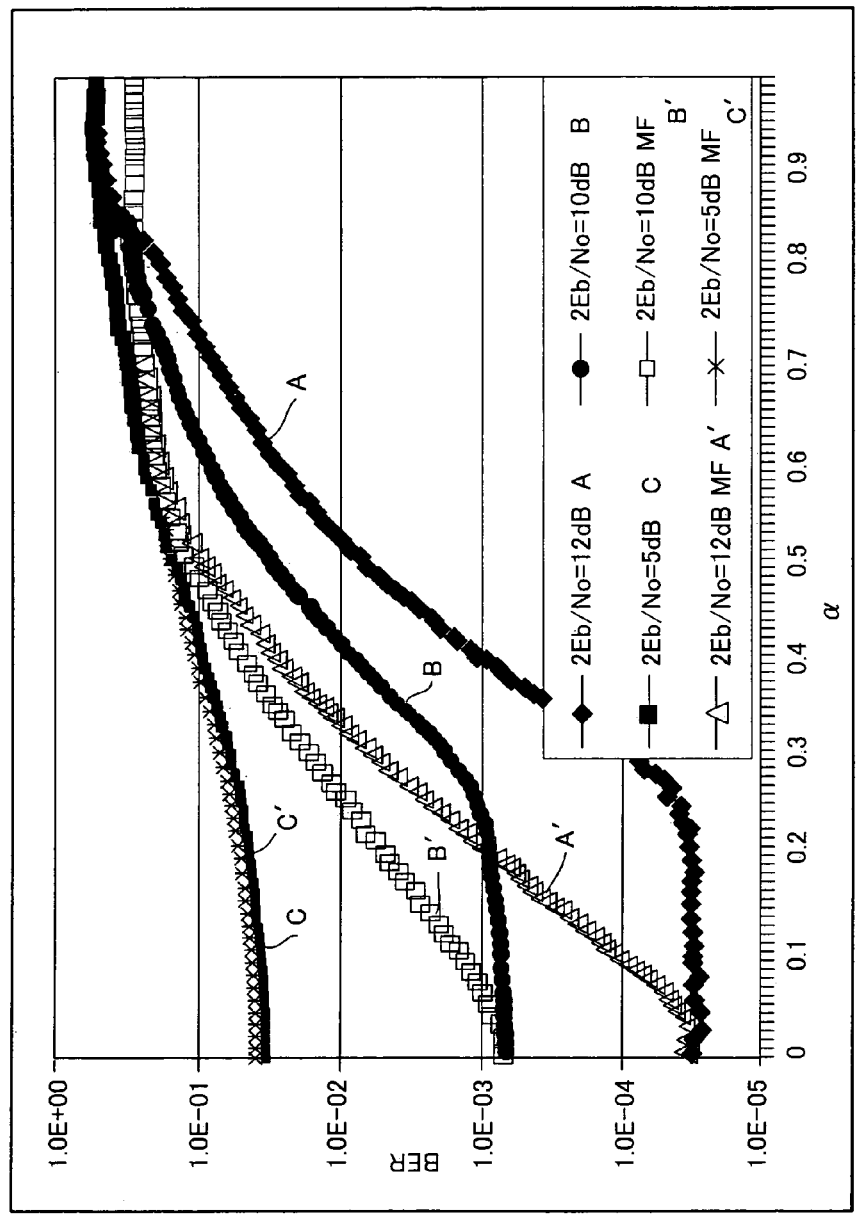
FIG. 9 shows the mean BER performance of a turbo-receiver of this invention and of a conventional matched-filter-based receiver, as a function of the ICI coupling coefficient $\alpha$, and with Eb/N$_0$ as a parameter.

FIG. 9 shows the mean BER performance of a turbo-receiver of this invention and of a matched-filter-based receiver, as a function of the ICI coupling coefficient $\alpha$ ($=\alpha_{01}=\alpha_{0-1}$), with $2Eb/N_0$ as a parameter. In FIG. 9, the BER of the matched-filter receiver is shown as "MF". As is clear from the plot, a turbo-receiver of this invention provides satisfactory BER performance over a wide range of values of the ICI coupling coefficient $\alpha$. However, the greatest improvement in BER in FIG. 9 is for a large value of $2Eb/N_0$ (S/N ratio).

The above behavior may be explained as follows. At low S/N ratios, input noise dominates ICI, which in this invention functions to improve the estimated posterior probability, and so data reliability is degraded. On the other hand, when the S/N ratio is sufficiently high, ICI dominates the noise. In such cases, through the benefits of nonlinear signal processing by the receiver, the BER is improved while alleviating the effect of ICI. The above may be regarded as the range of $\alpha$ over which substantial improvement of the BER is achieved.

When the ICI coupling is relatively small ($\alpha<0.3$), signals from the subchannel of interest cause distortion of signals transmitted in other subchannels, but this distortion is not so prominent, and data transmitted over adjacent subchannels can be reliably estimated. This estimation for adjacent subchannels is subsequently utilized in posterior probability estimations for the subchannel of interest. Similarly, estimates for the subchannel of interest are subsequently utilized in posterior probability estimates for other adjacent subchannels. By further increasing $\alpha$, signals in adjacent subchannels are more strongly distorted, and consequently all estimates become extremely unreliable. This fact is reflected in FIG. 9. That is, when $\alpha$ exceeds a certain value, the BER performance begins to worsen markedly as the ICI coupling coefficient increases. A receiver of this invention operates intelligently with respect to the above process. That is, the coefficients of the transfer function of nonlinear units are adjusted according to the noise level $N_0$ and the ICI coupling coefficients present in $\Delta E_1$, $\Delta E_2$, and $\Delta E\Sigma$.

(E) Application to DMT Systems

Figure 10:
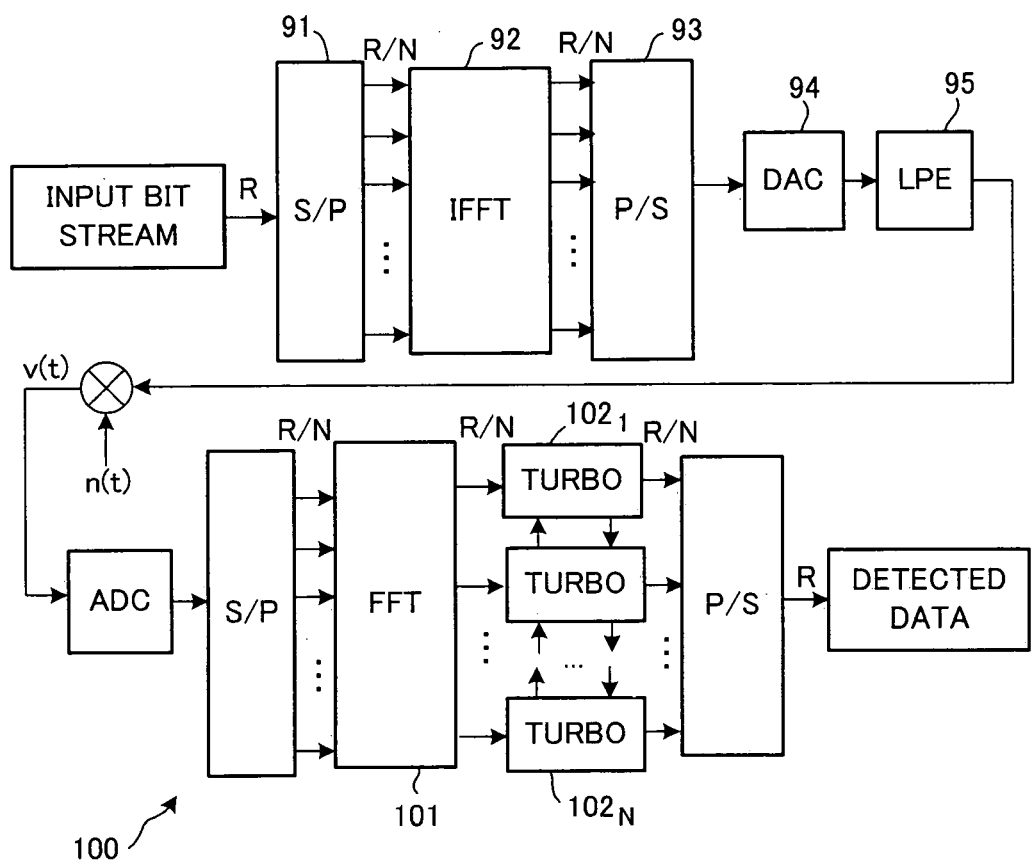
FIG. 10 shows the configuration of a DMT-based communication system to which a turbo-receiver is applied.

A DMT-based communication system is considered as an application of the turbo-receiver of this invention. FIG. 10 shows the configuration of a DMT-based communication system to which the turbo-receiver is applied; in this configuration, the turbo-receiver of this invention is positioned in a stage after the FFT portion of the receiver in a well-known DMT communication system.

Figure 11:
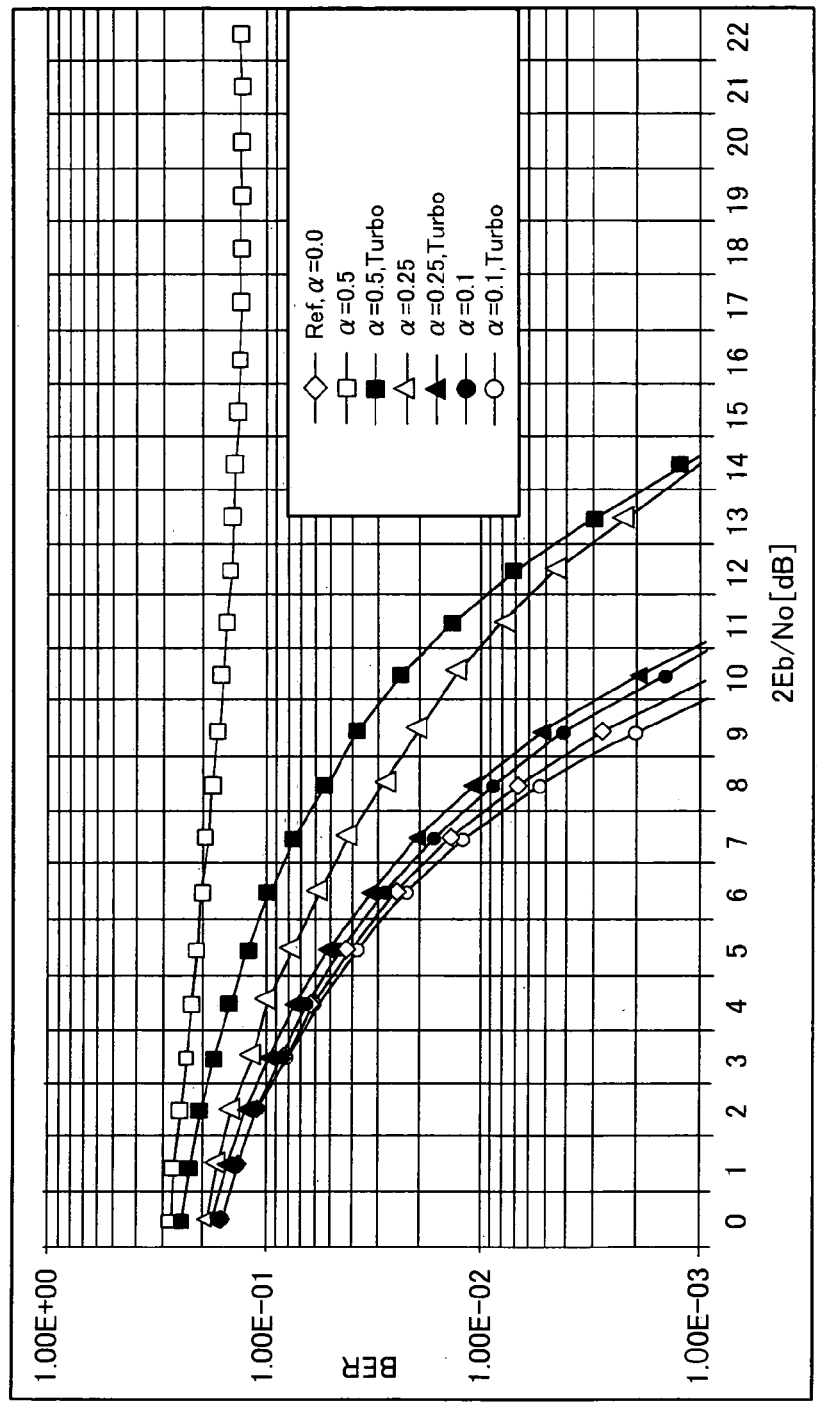
FIG. 11 shows the BER performance of a conventional DMT-based receiver, as well as the BER performance of a DMT receiver (N=4) comprising turbo-processing functions of this invention; and, FIG. 12 shows the BER performance of a conventional DMT-based receiver, as well as the BER performance of a DMT receiver (N=64) comprising turbo-processing functions of this invention.
Figure 12:
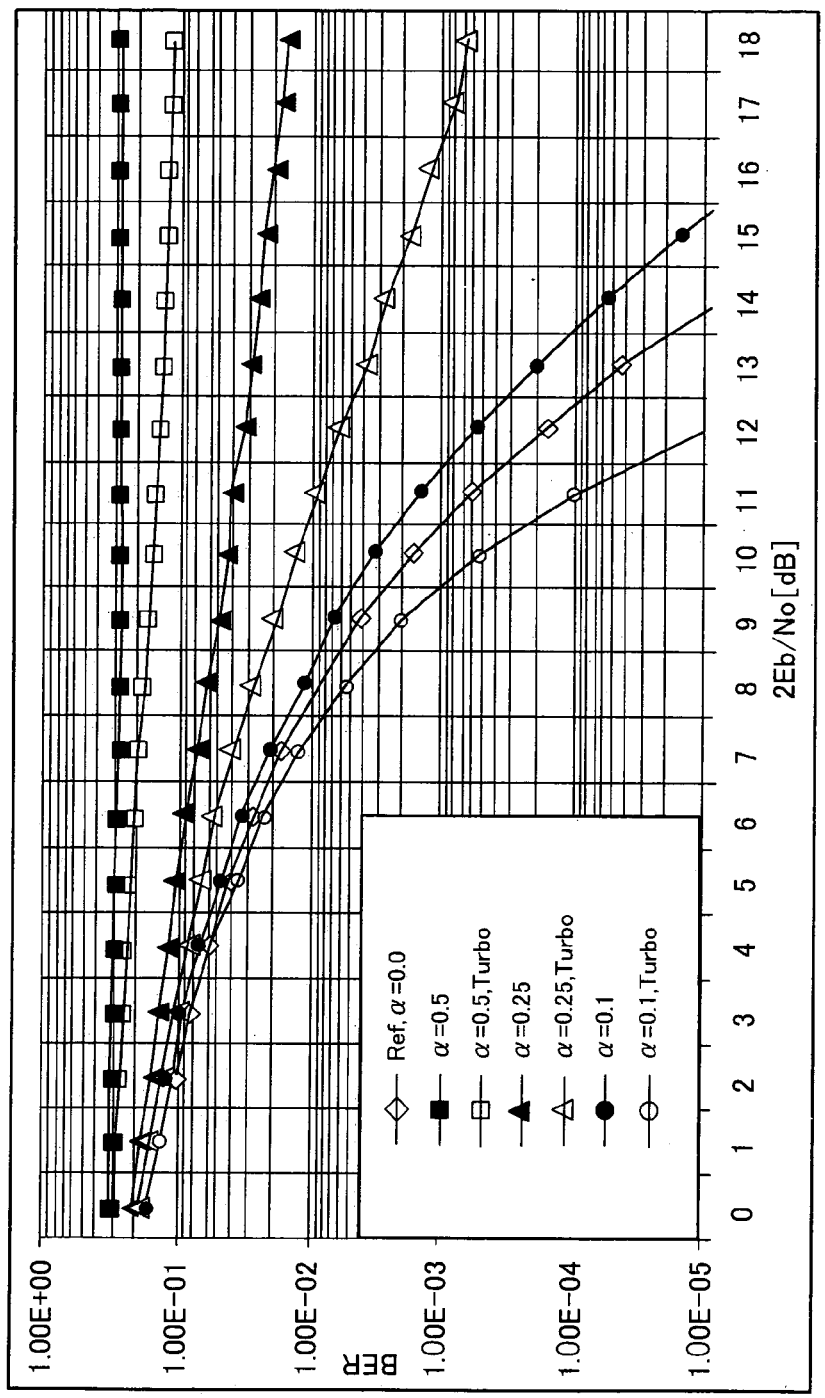

In the communication system of FIG. 10, an input bit stream at a data rate R (bits/sec or bps) after the serial/parallel (S/P) converter 91 is transferred in N parallel subchannels at a new rate R/N (bps). The N-point IFFT 92 combines N parallel data streams for conversion into a single set of sample signals in the realtime domain. In the parallel/serial (P/S) converter 93, these N samples are converted into a serial format, and the result is input continuously into a digital/analog converter (DAC) 94. The output signal from the low-pass filter (LPF) 95 on the DAC output side is a continuous-time DMT signal. In a white Gaussian noise channel, the transmitted DMT signal is degraded due to the white Gaussian noise n(t) when sent to the DMT receiver 100. The receiver executes functions which are the reverse of those of the transmitter. The FFT 101 performs demodulation processing of the signals sent in each subchannel as an N-matched-filter array. Turbo $102_1$ to $102_N$ perform subchannel processing based on the turbo algorithm of this invention, so that the BER is improved even if a frequency offset exists. FIG. 11 and FIG. 12 show the BER performance of conventional DMT-based receivers, as well as the BER performance of a DMT receiver, comprising the turbo processing functions of this invention, which performs four turbo processing repetitions. However, FIG. 11 shows the case of N=4 and FIG. 12 shows the case of N=16, and the BER performance is plotted against $2Eb/N_0$, taking as a parameter the frequency offset normalized by the frequency difference between channels; the BER characteristics for this invention are indicated by "turbo".

From FIG. 11 and FIG. 12 it is seen that the smaller the frequency offset, the better is the BER characteristic, and that the BER characteristic is better for this invention than for a conventional device.

In the above, the effects of ICI in adjacent subchannels of a multicarrier communication system have been studied. The performance of a conventional matched-filter receiver deteriorates rapidly as the coupling between adjacent subchannels increases, or as the frequency offset increases. In contrast, a receiver of this invention, based on estimated posterior probabilities, is a turbo-receiver in which the receiver of each subchannel passes information to the receivers of adjacent subchannels, and information derived from the receivers of adjacent subchannels is used in order to refine estimated posterior probabilities. Consequently the BER performance of a turbo-receiver of this invention can be improved substantially compared with a conventional matched-filter receiver, because the nonlinear signal processing of the turbo algorithm in this invention can utilize the information obtained from neighboring subchannels to maximum posterior probabilities. The greatest improvement in BER occurs in the area of high S/N in which ICI dominates over Gaussian noise. According to simulation results, a turbo-receiver of this invention can achieve satisfactory performance over a considerably broad range of ICI coupling constants.

What is claimed is:

1. A multicarrier communication system, in which signals are transmitted and received via at least three adjacent subchannels, comprising:
   a transmission device, which independently transmits data over at least three adjacent subchannels;
   a reception device, comprising a reception portion, provided for each subchannel, which receives data from the corresponding subchannel and performs soft decisions on the received data; and,
   means for inputting, to the reception portion of the central subchannel, the soft decision values in reception portions of two adjacent subchannels; and wherein
   the reception portion of the central subchannel uses the soft decision values input from the two adjacent reception portions to adjust the soft decision value for the central subchannel, and makes decisions on received data based on the soft decision values.

2. The multicarrier communication system according to claim 1, wherein each of said reception portions comprises:
   means for computing, as said soft decision values, the difference between the probability that data received from a subchannel of interest is one among two values, and the probability that the data is the other value, taking into account the degree of coupling between subchannels;
   means for adjusting the soft decision value for the subchannel of interest, using said soft decision values input from the two reception portions of the adjacent subchannels; and,
   a decision portion for making decisions on received data based on the soft decision values.

3. The multicarrier communication system according to claim 1, wherein the reception portion of said central subchannel comprises:
   means for creating a first reference signal when the data transmitted by three subchannel signals is the same, computed taking into account crosstalk from two other subchannels, and for creating second, third, and fourth reference signals for each of the three combinations when exactly one among the three data items transmitted by said three subchannel signals is different, taking into account crosstalk from the other two subchannels;
   four correlation means for integrating the results of multiplication of each of the reference signals with the actual received signal;
   means for synthesizing the correlation means outputs and for outputting the soft decision value for the subchannel of interest, as well as for outputting three correlation synthesis signals for adjustment of the soft decision value;
   first through third addition portions for adding said soft decision values input from the reception portions of adjacent subchannels to said three correlation synthesis signals;
   means for computing an adjustment value to adjust the soft decision value for the subchannel of interest, based on the addition results of each of the addition portions;
   an adjustment portion for adding said adjustment values to said soft decision value for the subchannel of interest to adjust the soft decision value for the subchannel of interest; and,
   a decision portion to make decisions on received data based on the soft decision value.

4. The multicarrier communication system according to claim 3, wherein said reception device is provided in a stage after the FFT portion constituting a DMT communication system.

5. A reception device, in a multicarrier communication system in which data is transmitted independently via at least three adjacent subchannels, comprising:
   soft decision value output means, which computes, as a soft decision value, the difference between the probability that data received from the subchannel of interest is one among two values and the probability that the data is the other value, taking into account the degree of coupling between channels, and moreover which uses the soft decision values input from the reception portions of adjacent subchannels to adjust the soft decision value of the subchannel of interest and output the result; and,
   a decision portion, which makes a decision on received data based on the adjusted soft decision value.

6. The reception device according to claim 5, wherein said soft decision value output means comprises:
   means for creating a first reference signal when the data transmitted by three subchannel signals is the same, computed taking into account crosstalk from two other subchannels, and for creating second, third, and fourth reference signals for each of the three combinations when exactly one among the three data items transmitted by said three subchannel signals is different, taking into account crosstalk from the other two subchannels;
   four correlation means for integrating the results of multiplication of each of the reference signals with the actual received signal;
   means for synthesizing the correlation means outputs and for outputting the soft decision value for the subchannel of interest, as well as for outputting three correlation synthesis signals for adjustment of the soft decision value;
   first through third addition portions for adding said soft decision values input from the reception portions of adjacent subchannels to said three correlation synthesis signals;
   means for computing an adjustment value to adjust the soft decision value for the subchannel of interest, based on the addition results of each of the addition portions; and,
   an adjustment portion for adding said adjustment values to said soft decision value for the subchannel of interest to adjust the soft decision value for the subchannel of interest.

7. The reception device according to claim 6, wherein said adjustment value computation means comprises:
   a first adjustment portion, to compute a first adjustment value to adjust the soft decision value for the subchannel of interest based on the addition result of said first addition portion;
   a second adjustment portion, to compute a second adjustment value to adjust the soft decision value for the subchannel of interest based on the addition result of said second addition portion; and,
   a third adjustment portion; to compute a third adjustment value to adjust the soft decision value for the subchannel of interest based on the addition result of said third addition portion; and wherein
   each adjustment portion comprises a nonlinear unit which indicates a negative amplitude limit for negative-input, indicates a positive amplitude limit for positive input, and for which there is a linear relation between input and output on both sides of zero input.

* * * * *